(12) United States Patent
Abadi et al.

(10) Patent No.: US 8,935,232 B2
(45) Date of Patent: Jan. 13, 2015

(54) QUERY EXECUTION SYSTEMS AND METHODS

(75) Inventors: Daniel Abadi, Sudbury, MA (US); Kamil Bajda-Pawlikowski, New Haven, CT (US)

(73) Assignee: Yale University, New Haven, CT (US)

( * ) Notice: Subject to any disclaimer, the term of this patent is extended or adjusted under 35 U.S.C. 154(b) by 0 days.

(21) Appl. No.: 13/032,551

(22) Filed: Feb. 22, 2011

(65) Prior Publication Data

US 2011/0302151 A1    Dec. 8, 2011

Related U.S. Application Data

(60) Provisional application No. 61/396,895, filed on Jun. 4, 2010.

(51) Int. Cl.
*G06F 17/30*    (2006.01)

(52) U.S. Cl.
CPC .... *G06F 17/30498* (2013.01); *G06F 17/30445* (2013.01); *G06F 17/30463* (2013.01); *G06F 17/30471* (2013.01); *G06F 17/30545* (2013.01)
USPC .......................................... 707/714; 707/713

(58) Field of Classification Search
CPC .................... G06F 17/30545; G06F 17/30463; G06F 17/30498; G06F 17/30471; G06F 17/30445
USPC ......................................................... 707/714
See application file for complete search history.

(56) References Cited

U.S. PATENT DOCUMENTS

| | | | |
|---|---|---|---|
| 4,412,130 A | 10/1983 | Winters | |
| 4,615,870 A | 10/1986 | Armstrong et al. | |
| 5,179,699 A | 1/1993 | Iyer et al. | |
| 5,413,154 A | 5/1995 | Hurst, Jr. et al. | |
| 6,357,536 B1 | 3/2002 | Schrader et al. | |
| 7,085,769 B1 * | 8/2006 | Luo et al. | 707/999.01 |
| 7,957,365 B2 | 6/2011 | Hsu et al. | |
| 8,069,210 B2 * | 11/2011 | Gillum et al. | 709/206 |

(Continued)

FOREIGN PATENT DOCUMENTS

| | | |
|---|---|---|
| WO | WO-2011/153239 A2 | 12/2011 |
| WO | WO-2011/153242 A1 | 12/2011 |
| WO | WO-2013/009503 A2 | 1/2013 |

OTHER PUBLICATIONS

Abouzeid, Azza et al., "HadoopDB: An Architectural Hybrid of MapReduce and DBMS Technologies for Analytical Workloads", Proceedings of VLDB, (2009).

(Continued)

*Primary Examiner* — Rehana Perveen
*Assistant Examiner* — Tiffany Thuy Bui
(74) *Attorney, Agent, or Firm* — Mintz Levin Cohn Ferris Glovsky and Popeo, P.C.

(57) ABSTRACT

System, method, and computer program product for processing data are disclosed. The method includes receiving a query for processing of data, wherein the data is stored in a table in a plurality of tables, wherein the table is stored on at least one node within the database system, determining an attribute of the table and another table in the plurality of tables, partitioning one of the table and the another table in the plurality of tables using the determined attribute into a plurality of partitions, and performing a join of at least two partitions of the table and the another table using the determined attribute. The join is performed on a single node in the database system.

34 Claims, 12 Drawing Sheets

(56) References Cited

U.S. PATENT DOCUMENTS

| | | | |
|---|---|---|---|
| 8,555,265 | B2* | 10/2013 | Chambers et al. ............ 717/149 |
| 2004/0007142 | A1 | 1/2004 | Jollez et al. |
| 2005/0092523 | A1 | 5/2005 | McCaskill et al. |
| 2005/0183574 | A1 | 8/2005 | Burnett et al. |
| 2005/0263541 | A1 | 12/2005 | Hoff et al. |
| 2006/0117036 | A1* | 6/2006 | Cruanes et al. ............ 707/100 |
| 2007/0038659 | A1* | 2/2007 | Datar et al. .................. 707/101 |
| 2008/0086442 | A1* | 4/2008 | Dasdan et al. .................. 707/1 |
| 2008/0098370 | A1* | 4/2008 | Fontoura et al. ............. 717/139 |
| 2008/0120314 | A1* | 5/2008 | Yang et al. .................... 707/101 |
| 2008/0126397 | A1 | 5/2008 | Alexander et al. |
| 2008/0243908 | A1 | 10/2008 | Aasman et al. |
| 2009/0055370 | A1* | 2/2009 | Dagum et al. .................... 707/4 |
| 2009/0132474 | A1 | 5/2009 | Ma et al. |
| 2009/0271412 | A1* | 10/2009 | Lacapra et al. ................. 707/10 |
| 2009/0319550 | A1 | 12/2009 | Shau et al. |
| 2010/0083194 | A1 | 4/2010 | Bagherjeiran et al. |
| 2010/0114628 | A1 | 5/2010 | Adler et al. |
| 2010/0241644 | A1 | 9/2010 | Jackson et al. |
| 2010/0241828 | A1* | 9/2010 | Yu et al. ........................ 712/30 |
| 2010/0281166 | A1* | 11/2010 | Buyya et al. .................. 709/226 |
| 2011/0191361 | A1* | 8/2011 | Gupta et al. .................. 707/763 |
| 2011/0202534 | A1 | 8/2011 | Allerton |
| 2011/0302226 | A1 | 12/2011 | Abadi et al. |
| 2011/0302583 | A1 | 12/2011 | Abadi et al. |
| 2011/0314019 | A1 | 12/2011 | Jimenez Peris et al. |
| 2011/0320431 | A1 | 12/2011 | Jackson et al. |
| 2012/0310916 | A1 | 12/2012 | Abadi et al. |

OTHER PUBLICATIONS

Chen, Qiming et al., "Efficiently Support MapReduce-Like Computation Models Inside Parallel DBMS", Proceedings of the 2009 International Database engineering & Applications Symposium, Series—Ideas, pp. 43-53, (2009).

Choi, Hyunsik, et al., "Spider", Proceedings of the 18th ACM Conference on Information and Knowledge Management, CIKM, pp. 2087-2088, (2009).

Dean, et al., "MapReduce: Simplified Data Processing on Large Clusters", Communications of the ACM, 51:1 (2008).

Elmasri et al., "Fundamentals of Database Systems", Fourth Edition, (2004).

Gennick, Jonathan, et al., "Oracle SQL*Loader: The Definitive Guide", pp. 1-242 (2001).

Graefe, G., "Query Evaluation Techniques for Large Databases", ACM Computing Surveys, ACM, 25:2, pp. 73-170, (1993).

Guo, Y., et al., "Lubm: A benchmark for owl knowledge base systems," J. Web Sem., 3(2-3):158-182, (2005).

Ideros, S., et al., "Database cracking", CIDR '07, pp. 68-78, (2007).

Ideros, S., et al., "Self-organizing tuple reconstruction in column-stores", SIGMOD '09, pp. 297-230, (2009).

Kossman, D., "The State of the Art in Distributed Query Processing", ACM Computing Surveys, 32:4, pp. 422-469 (2000).

Neumann, T., et al., "The rdf-3x engine for scalable management of rdf data," The VLDB Journal, 19:91-113, (2010).

PeterS@AWS, *"Processing and Loading Data from Amazon S3 to the Vertica Analytic Database"*, http://aws.amazon.com/articles/2571 (2009).

Rohloff, K., et al., "High-performance, massively scalable distributed systems using the mapreduce software framework: The shard triple-store. International Workshop on Programming Support Innovations for Emerging Distributed Applications," (2010).

SPARQL Query Language for RDF, W3C Working Draft 4, (2006).

Stonebraker, Michael et al., "MapReduce and Parallel DBMSs: Friends or Foes?", Communications of the ACM, 53:1, p. 64, (2010).

Yang, Christopher et al., "Osprey: Implementing MapReduce-Style Fault Tolerance in a Shared-Nothing Distributed Database", Data Engineering (ICDE), IEEE 26th International Conference pp. 657-668, (2010).

Ying Yan, et al., "Efficient Indices Using Graph Partitioning in RDF Triple Stores", Data Engineering, 2009, ICDE, IEEE 25th International Conference on Engineering, pp. 1263-1266, (2009).

Zukowski, M., "Balancing Vectorized Query Execution with Bandwidth-Optimized Storage", Ph.D. Thesis, Universiteit van Amsterdam, Amsterdam, The Netherlands, (2009).

http://hadoop.apache.org.
http://issues.apache.org/jira/browse/HIVE-600.
http://www.hadoop.apache.org/core.
http://www.issues.apache.org/jira/browse/HADOOP-3601.
http://www.postqresql.org.
http://www.tpc.org/tpch.
http://www.tpc.org/tpch/default.asp.
http://www.vectorwise.com.
http://www.w3.org/TR/rdf-sparql-query.

International Search Report for PCT/US2011/038763 mailed Aug. 26, 2011.

International Search Report for PCT/US2012/044981 mailed Apr. 11, 2014.

International Search Report for PCT/US2011/038758 mailed Mar. 14, 2013.

* cited by examiner

QUERY EXECUTION SYSTEMS AND METHODS

CROSS-REFERENCE TO RELATED APPLICATONS

The present application claims priority to U.S. Provisional Patent Application No. 61/396,895 to Abadi, filed on Jun. 4, 2010, and entitled "Split Query Execution Strategies Across Hadoop and Database Systems" and incorporates its disclosure herein by reference in its entirety.

TECHNICAL FIELD

The present application generally relates to systems and methods for analytical data management, and in particular, to systems and methods for performing a data warehousing query.

BACKGROUND

Large scale data processing involves extraction of data of interest from a set of raw data located in one or more databases and then processing the extracted data into desired form. Extraction is accomplished through requests, or queries, which are executed on the stored data. Because significant portions of data are extracted from large of amounts of data stored and subsequently formatted, such queries are typically complex and require development of a particular execution plan as well as considerable processing time. Many conventional techniques have been known to process such queries. Some of these include a MapReduce technique.

In order to execute a complex data warehousing query in a MapReduce-based system, such query needs to be translated into a series of MapReduce ("MR") jobs. Since each MR job typically involves many input/output ("I/O") operations and network transfers, an efficient query execution plan is typically composed of as few MR jobs as possible. Moreover, each job attempts to minimize the amount of data written to disk or sent over network.

Some conventional systems employ MapReduce as an extremely popular framework for performing scalable parallel advanced analytics and data mining. Despite the fact that there is nothing fundamentally new about the technology, the availability of a free and open source implementation (see, e.g., http://hadoop.apache.org ("Hadoop")), along with its heavy utilization and evangelization by two of the largest Web companies in the world (Google and Yahoo), stellar performance on extreme-scale benchmarks, and impressive ease-of-use experience, has lead to its rapid adoption for many different kinds of data analysis and data processing.

Historically, main applications of the MapReduce framework were in the Web indexing, text analytics, and graph data mining areas. However, as MapReduce continues its steady progression towards becoming the de facto data analysis standard, it has started to be used for structured data analysis tasks traditionally dominated by relational databases in data warehouse deployments. Even though there are many who argue that MapReduce is not optimal for structured data analysis tasks, it is nonetheless being used increasingly frequently for these tasks due to the desire to unify the data management platform. Thus, the standard, structured data analysis can proceed side-by-side with the complex analytics that MapReduce is well-suited for, along with the superior scalability of MapReduce and lower price. For example, Facebook famously ran a proof of concept comparing multiple parallel relational database vendors before deciding to run their 2.5 petabyte clickstream data warehouse using Hadoop instead.

Consequently, there has been a significant amount of research and commercial activity in recent years with the goal of integrating MapReduce and relational database technology. This activity can be divided into two main directions: (1) starting with a parallel database system and adding MapReduce technology (or at least a MapReduce interface), and (2) starting with MapReduce (typically the Hadoop implementation) and adding database system technology.

However, there have been many performance problems with Hadoop systems when applied to structured data because of an unoptimal storage layer. The default Hadoop system's storage layer is the Hadoop distributed file system ("HDFS"). Hadoop has been implemented with an open-source data warehousing infrastructure that has been built on top of Hadoop (see, e.g., http://hadoop.apache.org/hive ("Hive")). Facebook, which was the creator and main user of Hive, is currently managing an over 700 TB dataset (before replication), with 5 TB added daily. Over 7500 requests (or jobs) are submitted each day to analyze more than 75 TB of compressed data. Hive provides tools that enable data summarization, adhoc querying and analysis of detail data as well as a mechanism to impose structure on the data. In addition, it also provides a simple query language called QL or HiveQL, which is based on SQL and enables users familiar with SQL to do adhoc querying, summarization and data analysis. At the same time, this language also allows traditional MapReduce programmers to plug in their custom mappers and reducers more sophisticated analysis capabilities which may not be supported by the built-in capabilities of the language. Hive accepts queries expressed in HiveQL and executes them against data stored in HDFS. The relational mapping over the data is maintained in a system catalog called Metastore.

Hive's query compiler processes HiveQL statements in a series of steps. First, query parsing and validation against metadata (table definitions and data types) is performed. Next, the resulting operator DAG is transformed by the optimizer. Hive supports the following rule-based transformations: column pruning, predicate pushdown, join reordering, and partition pruning. After optimization, the logical query plan is translated into a physical plan—a series of MapReduce jobs and HDFS tasks. Hive's query executor coordinates the execution of each stage of the query plan. Custom operations, such as map side joins, hash-based partial aggregations, and repartitioned group by to handle skew are applied during runtime when appropriate. Intermediate data are stored into HDFS as temporary tables. A major limitation of the Hive data warehouse is its data storage layer. By employing a distributed file system, Hive is unable to utilize hash-partitioning and collocation of related tables, a typical strategy parallel databases exploit to minimize data movement across nodes. Moreover, Hive workloads are very I/O heavy due to lack of indexing. Furthermore, the system catalog lacks statistics on data distribution and Hive's optimizer is quite unsophisticated because no cost-based or adaptive algorithms were applied.

Thus, there is a need for a more efficient data processing systems and methods for obtaining large-size data from even bigger data sets stored in databases through execution of requests or queries.

SUMMARY

In some embodiments, the current subject matter relates to a method for processing data in a database system containing a plurality of nodes. The method includes receiving a query for processing of data, wherein the data is stored in a table in a plurality of tables, wherein the table is stored on at least one node within the database system, determining an attribute of the table and another table in the plurality of tables, partitioning one of the table and the another table in the plurality of tables using the determined attribute into a plurality of partitions, and performing a join of at least two partitions of the table and the another table using the determined attribute. The join is performed on a single node in the database system. In some embodiments, the table is smaller than another table. In alternate embodiments, the table is configured to be distributed to all nodes containing a partition of the another table, the table and the partition of the another table being partitioned on determined attribute. The smaller table can be a dictionary table.

In some embodiments, the method further includes determining a join attribute for each table partition of the stored data, determining whether to re-partition at least one table of the stored data using the join attribute such that partitions of tables having the same join attribute are joined at a single node in the database system, and using the join attribute, performing a join of tables at the single node.

In alternate embodiments, the method further includes selecting a column within a table to generate the column join attribute for the step performing of the join and using the column join attribute, performing a join of tables at the single node in the database system.

In some embodiments, the method also includes initiating a first processing task and using the initiated first processing task, performing the partitioning and joining steps. A second processing task can be initiated during which selecting and joining steps are performed. The first processing task and the second processing task can be MapReduce processing tasks.

In some embodiments, the current subject matter relates to a system for processing data in a database system containing a plurality of nodes. The system includes a receiving module configured to received a query for processing of data, wherein the data is stored in a table in a plurality of tables, wherein the table is stored on at least one node within the database system. The system also includes a partitioning module configured to partition one of the table and the another table in the plurality of tables using a determined attribute into a plurality of partitions, wherein the determined attribute is an attribute of the table and the another table. A join module can be configured to perform a join of at least two partitions of the table and the another table using the determined attribute. The join is performed on a single node in the database system.

In some embodiments, the current subject matter relates to a computer program product, tangibly embodied in a computer-readable medium, the computer program product being operable to cause a data processing system containing a database system having a plurality of nodes, to perform operations including receiving a query for processing of data, wherein the data is stored in a table in a plurality of tables, wherein the table is stored on at least one node within the database system, determining an attribute of the table and another table in the plurality of tables, partitioning one of the table and the another table in the plurality of tables using the determined attribute into a plurality of partitions, and performing a join of at least two partitions of the table and the another table using the determined attribute. The join is performed on a single node in the database system.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The current subject matter is described with reference to the accompanying drawings. In the drawings, like reference numbers indicate identical or functionally similar elements.

DETAILED DESCRIPTION

Figure 1:
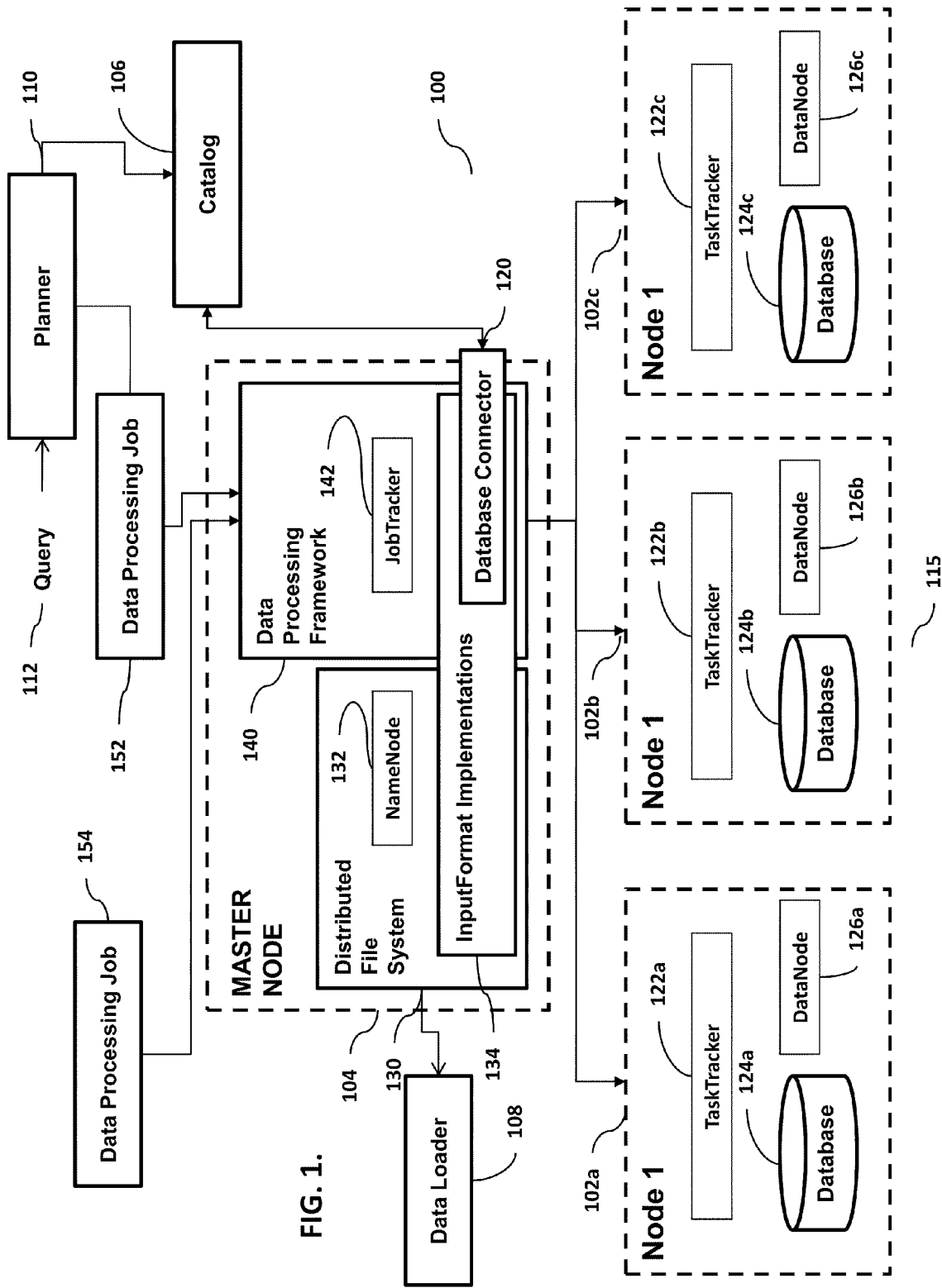
FIG. 1 illustrates an exemplary embodiment of a system for data processing, according to some embodiments of the current subject matter.

FIG. 1 illustrates an exemplary data processing system 100, according to some embodiments of the current subject matter. The system 100 can be configured to connect a plurality of nodes 102 (a, b, c) with a master node 104. A master node 104 may be configured to receive a processing task (e.g., a query) and distribute various processing tasks involved in the query to nodes 102. In some embodiments, the nodes can be configured to be connected using a communication layer (not shown in FIG. 1). In some embodiments, a MapReduce ("MR") framework can be used as such communication layer. As can be understood by one having ordinary skill in the art, other types of frameworks can be used and the current subject matter is not limited to the MR framework. Each node 102 is configured to include a task tracker component 122, a database 124, and a data node 126. As shown in FIG. 1, the system 100 further includes the following components/processing components: a database connector component 120, a catalog component 106, a data loader component 108, and a query execution planning component or planner 110. A query (e.g., an SQL query) for processing on nodes 102 can be received by the planner 110. The planner 112 can be configured to communicate with the master node 104's database processing framework 140 that can be further configured to generate various tasks and pass them onto the nodes 102 for processing, as discussed below. By way of an example. the database processing framework 140 can include a MapReduce framework or any type of framework. As can be understood by one skilled in the art, the current subject matter is not limited to the any particular database processing framework. In some embodiments, a partition of a data processing task can refer to an execution of a series of processing tasks (such as relational operators) on a partition of data (as may be the case for tasks assigned to database systems) or an execution of a series of processing tasks on an entire dataset (as may be the case for a partition assigned to a data processing framework).

In some embodiments, the system 100 can be configured to implement a distributed file system ("DFS") that can be used for connecting multiple single-node database systems and can be configured as a task coordinator and a network communication layer. In some embodiments, received queries can be parallelized across nodes using the framework 140 and the system 100 can be further configured to distribute processing of a query to single-node's databases 124 (a, b, c). For example, upon receipt of a query 112 (or a data processing task), a query execution plan can be generated, whereby the query can be broken up into various partitions, parts and/or tasks, which can be further distributed across the nodes 102 (a, b, c) in a cluster for processing. In some embodiments, such processing can occur in parallel on all nodes 102 that receive a query task. Distribution of tasks can be done based on node availability and capacity. For example, a node cannot receive more data than it can optimally store and/or handle/manage. If data is to be loaded into the database nodes, the data can be broken up/partitioned into a plurality of portions and distributed across nodes based on various factors, including but not limited to, capacity, node's ability to process specific data, etc. Upon distribution of data and/or tasks to independent nodes, each node can be configured to process the tasks/data and the system 100 can be configured to coordinate such processing and node performance (e.g., a job tracker 142 can be configured to coordinate and monitor node-processing and performance). In some embodiments, portions (or partitions) of data/task can be independent of one another, while other portions can require inter-node communication and coordination to process a task. The independent portions might not require such coordination/communication. The catalog storage component 106 can be configured to maintain/track information about each data partition being sent to nodes 102. Through such distribution, use of various scheduling tools, and job tracking, the system 100 can be configured to achieve an excellent fault tolerance and ability to operate in heterogeneous environments. The system 100 can further achieve great performance of parallel databases by processing queries inside engines of databases 124.

Referring back to FIG. 1, system 100 further includes two layers: (i) a data storage layer or a distributed file system ("DFS") 130, and (ii) a data processing layer or framework 140. DFS 130 is shown as a block-structured file system that can be managed by a central name node 132 (shown as "NameNode"). In operation, individual files can be broken into blocks of a predetermined fixed size and distributed across multiple data nodes 102 (a, b, c) in the cluster 115, where the cluster 115 consists of multiple single nodes 102. The name node 132 can be configured to maintain metadata about size and location of blocks and their replicas. As stated above, the catalog component 106 can be further configured to keep track of how and where the data is distributed.

As shown in FIG. 1, the data processing layer 140 follows simple master-slave architecture. The master is the master node 104 that includes a single job tracker 142 contained and the slaves or worker nodes are nodes 102(a, b, c) that include task trackers 122 (a, b, c). The job tracker 142 can handle runtime scheduling of data processing jobs 152, 154 (e.g., MapReduce jobs) and maintain information on each task tracker 122's load and available resources. The task trackers 122 can handle processing of processing of part or all of the data processing jobs that are assigned to them by the job tracker 142. Each processing job can be broken down into various phases, each of which includes a plurality of sub-tasks or sub-phases that perform processing based on the number of data blocks that require such processing. The job tracker 142 assigns tasks/sub-phases to task trackers 122 based on locality and load balancing. Locality can be determined by matching task trackers 122 to appropriate tasks that process data, which is local to them. The job tracker 142 can perform load-balancing by ensuring all available task trackers are assigned tasks. Task trackers 122 regularly update the job tracker 142 with their status through "heartbeat messages." A heartbeat message is a message sent from an origin (i.e., a task tracker) to a destination (i.e., a job tracker) that enables the destination to identify if and when the origin fails or is no longer available.

As shown in FIG. 1, the system 100 further includes an input format implementations library 134 which can be configured to be an interface between the storage layer 130 and the processing layer 140. The input format implementations library 134 can be configured to parse text/binary or other types of files (or connect to arbitrary data sources) and to transform the data into key-value pairs that can be processed during one of the above phases. By way of an example, conventional Hadoop system can be configured to provide several input format implementations including one that allows single JAVA® database connectivity ("JDBC")-compliant database to be accessed by all tasks in one job in a given cluster.

Figure 2:
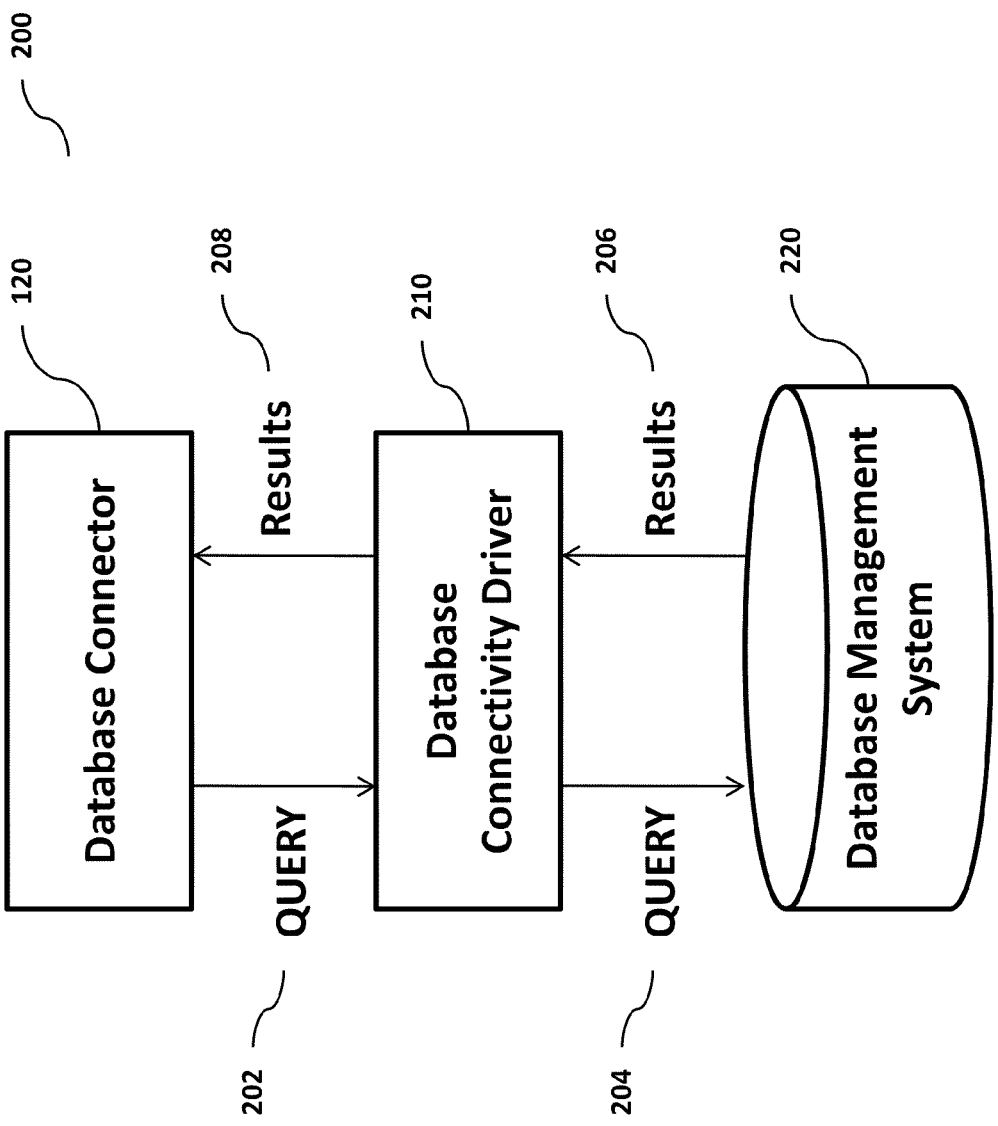
FIG. 2 illustrates an exemplary database connector component of the system shown in FIG. 1, according to some embodiments of the current subject matter.

In some embodiments, the database connector 120 can be configured to provide an interface between database systems 124 residing on nodes 102 in the cluster 115 and task trackers 122. The database connector 120 can be configured to be a part of the input format implementations library 134. In some embodiments, during query (phase, sub-phase, or task) processing/execution the connector 120 receives a data processing query (e.g., an SQL or any other type of programming language query) and appropriate connection parameters, which include, but are not limited to, which drivers to use, query fetch size and other query tuning parameters. The connector 120 is configured to connect to the database 124, execute the query and return results as key-value pairs. In some embodiments, the connector 120 can be configured to connect to any database that resides in the cluster 115. Prior to processing, queries can be configured to be optimized in accordance with requirements of a specific database. In some embodiments, examples of such databases include, but are not limited to, MySQL, PostgreSQL, column-store (i.e., storing content by columns rather than by rows) databases (e.g., open-source, MonetDB, InfoBright, etc.), and other database systems. Other types of database systems can be used with the system 100 and the current subject matter is not limited to the above-referenced database systems. FIG. 2 illustrates an exemplary operation 200 of the database connector 120, according to some embodiments of the current subject matter. As stated above, the database connector can receive a query for processing (e.g., obtaining specific data from a database management system 220, which can include databases 124). The query is initially processed by the database connector 120 and passed on (at 202) to a database connectivity driver 210 (e.g., JAVA® Database Connectivity Driver). The driver 210 then passes (at 204) the query to the database management system 220 for obtaining data requested in the query received by the database connector 120. The database management system 220 returns requested data (at 206) via the database connectivity driver 210 to the database connector 120 (at 208).

In some embodiments, the catalog component 106 can be configured to communicate with the planner 110 and database connector 120. The catalog 106 can be further configured to store meta-information about the databases 124. The information includes, but is not limited to, the following information: (i) connection parameters such as database location, driver class and credentials, (ii) metadata such as data sets contained in the cluster, replica locations, and data partitioning properties. The catalog 106 can be configured to store such meta-information in various formats, such as an XML file, in the DFS 130. This file can be accessed by job tracker 142 and task trackers 122 to retrieve information necessary to schedule tasks and process data needed by a query.

Figure 3:
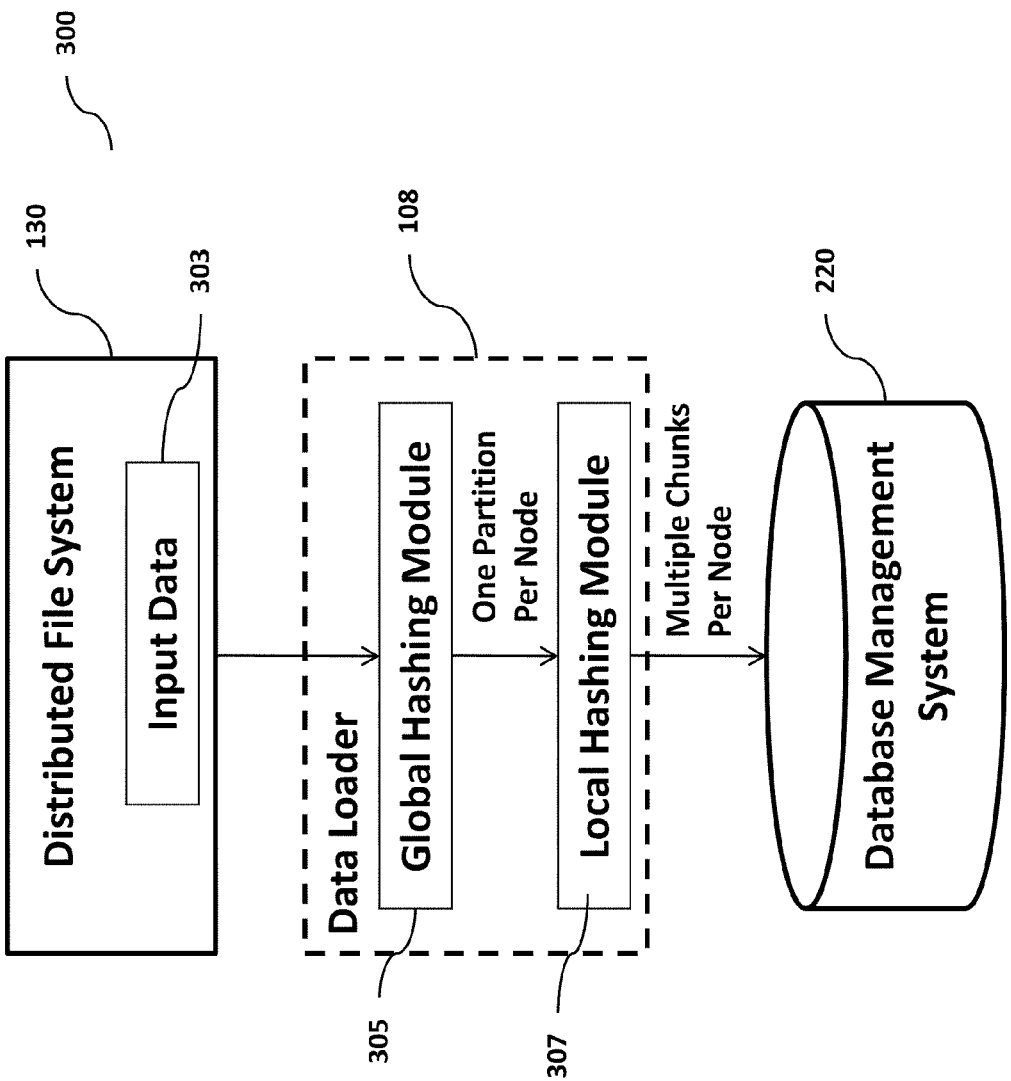
FIG. 3 illustrates an exemplary data loader component of the system shown in FIG. 1, according to some embodiments of the current subject matter.

In some embodiments, the data loader component 108 can be configured to (i) globally repartition data on a given partition key upon loading, (ii) break apart single node data into multiple smaller partitions or chunks and (iii) bulk-load the single-node databases with the chunks. FIG. 3 illustrates an exemplary operation 300 of the data loader component 108 in connection with system 100 shown in FIG. 1. The data loader 108 can include a global hashing component 305 and a local hashing component 307. The global hashing component 305 can be configured to read raw data files or input data 303 stored in the DFS 130 and repartition them into as many portions as there are nodes 102 in the cluster 115. The local hashing component 307 then copies a partition from the DFS 130 into a local file system of each node 102 and secondarily partitions the file into smaller sized chunks based on a predetermined maximum chunk size setting. In some embodiments, the maximum chunk setting can be predetermined by the system 100 or any other factors.

The hashing functions can be used by both the global hashing component 305 and the local hashing component 307 can be configured to be different in order to ensure that the resulting partitioned chunks have a uniform size. Additionally, the hashing functions can be further configured to ensure better load-balancing when executing processing phases/tasks over the stored data. Any hashing functions can be used for the global and/or local hashing components 305, 307.

Figure 4:
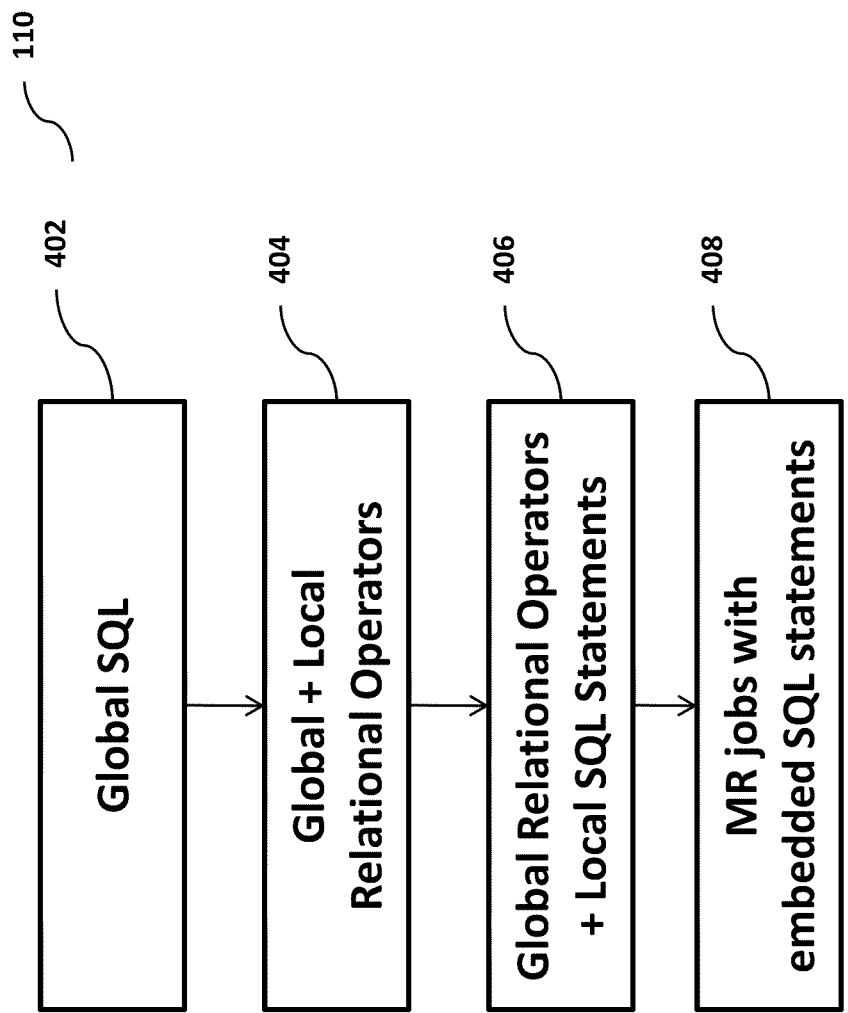
FIG. 4 illustrates an exemplary planner component of the system shown in FIG. 1, according to some embodiments of the current subject matter.

Thus, in some embodiments, the system 100 can be configured to provide a parallel database front-end for query processing purposes via the planner component 110. The planner 110 can be configured to provide an interface for the system 100 and can be further configured to receive a query 112 for further processing by the system 100. The planner 110 can be further configured to perform translation of the query into appropriate format in accordance with requirements of a particular database where data is stored. In some exemplary embodiments, as shown in FIG. 4, the planner 110 can transform SQL quer(ies) (at 402) into global and local relational operators (at 404), which are then transformed into global relational operators and local SQL statements, respectively (at 406), and finally transformed into MapReduce job(s) (at 408). The MapReduce job(s) are then further transformed into SQL language for processing by the nodes in the system 100. In order to process data from the DFS 130, the planner 110 can be configured to implement various relational operators, such as, filter, select (project), join, and aggregation, which operate as iterators: each operator forwards a data tuple to the next operator after processing it (a data tuple is an ordered list of elements). In some embodiments, the DFS 130 can be configured to store data in tables, which can be collocated on a node 102 (some tables can be not collocated). Each table can be stored as a separate file in the DFS 130. The current subject matter can be configured to process all types of tables (including collocated and not collocated tables) and if such tables are partitioned on the same attribute (a common identifier to some elements in the tables), a join operation (i.e., merging of data from tables based on a predetermined join attribute) can be accomplished at the database layer in its entirety.

As stated above, the current subject matter can be configured to push as much query processing as possible into the single-node databases 124 by issuing various processing directive(s) (e.g., SQL or any other programming language statements, commands, functions, etc.). Such processing directives can include selection, projection, and partial aggregation, which can be performed during various phases of a query. Since the current subject matter implements a parallel database processing system, it is capable of providing higher performance due to more efficient operator implementation, better I/O handling, and clustering/indexing provided by its database management system ("DBMS"). Parallel database processing allows for a more efficient processing of co-partitioned tables (e.g., tables that have been hash partitioned on a join attribute) by processing join operations inside the database system of each node. By processing join operations in the database system, joins become local operations (no need to send data over the network) and are performed inside the DBMS which typically implements these operations very efficiently.

Further, the current subject matter's system 100 can be configured to handle processing of even more complicated queries that include multi-stage tasks/jobs, where data being processed is combined from both a database system and DFS 130. The following discussion outlines various query execution techniques and their optimization that can be performed by the system 100, in accordance with some embodiments of the current subject matter. Such optimization techniques can include, but are not limited to, referential partitioning, side joins, side split semi-joins, post-join aggregation, and pre join aggregation. The optimization techniques can be configured to minimize an amount of data that has to be processed between various tasks of a data processing task (in the MapReduce framework, a Map and Reduce tasks). Such processing can include reading/writing data to a disk or sending it over network that connects nodes 102, which can greatly slow processing of the queries. As can be understood by one having ordinary skill in the relevant art, the above-referenced optimization techniques are provided here for exemplary non-limiting purposes only and other optimization techniques are possible.

By way of a background for the following discussion, a "join" is configured to combine records from two or more tables in a database. It creates a set that can be saved as a table or used as is. A join is a means for combining fields from two tables by using values common to each. ANSI standard SQL specifies four types of joins: "inner", "outer", "left", and "right". In special cases, a table (base table, view, or joined table) can join to itself in a self-join. A programmer can write a join predicate to identify the records for joining If the evaluated predicate is true, the combined record is then produced in the expected format, a record set or a temporary table, for example.

An inner join is the most common join operation used in applications and can be regarded as the default join-type Inner join creates a new result table by combining column values of two tables (A and B) based upon the join-predicate. The query compares each row of A with each row of B to find all pairs of rows which satisfy the join-predicate. When the join-predicate is satisfied, column values for each matched pair of rows of A and B are combined into a result row. The result of the join can be defined as the outcome of first taking the Cartesian product (or cross-join) of all records in the tables (combining every record in table A with every record in table B)—then return all records which satisfy the join predicate. One can further classify inner joins as equi-joins, as natural joins, or as cross-joins. An equi-join is a specific type of comparator-based join, or theta join, that uses only equality comparisons in the join-predicate. Using other comparison operators (such as <) disqualifies a join as an equi-join. A natural join offers a further specialization of equi-joins. The join predicate arises implicitly by comparing all columns in both tables that have the same column-name in the joined tables. The resulting joined table contains only one column for each pair of equally-named columns. A cross join, cartesian join or product provides the foundation upon which all types of inner joins operate. A cross join returns the cartesian product of the sets of records from the two joined tables. Thus, it equates to an inner join where the join-condition always evaluates to True or where the join-condition is absent from the statement. In other words, a cross join combines every row in B with every row in A. The number of rows in the result set will be the number of rows in A times the number of rows in B.

An outer join does not require each record in the two joined tables to have a matching record. The joined table retains each record—even if no other matching record exists. Outer joins subdivide further into left outer joins, right outer joins, and full outer joins, depending on which table(s) one retains the rows from (left, right, or both).

The result of a left outer join (or simply left join) for table A and B always contains all records of the "left" table (A), even if the join-condition does not find any matching record in the "right" table (B). This means that if the ON clause matches 0 (zero) records in B, the join will still return a row in the result—but with NULL in each column from B. This means that a left outer join returns all the values from the left table, plus matched values from the right table (or NULL in case of no matching join predicate). If the left table returns one row and the right table returns more than one matching row for it, the values in the left table will be repeated for each distinct row on the right table.

A right outer join (or right join) closely resembles a left outer join, except with the treatment of the tables reversed. Every row from the "right" table (B) will appear in the joined table at least once. If no matching row from the "left" table (A) exists, NULL will appear in columns from A for those records that have no match in B. A right outer join returns all the values from the right table and matched values from the left table (NULL in case of no matching join predicate).

A full outer join combines the results of both left and right outer joins. The joined table will contain all records from both tables, and fill in NULLs for missing matches on either side.

Conventional database-systems, which typically strive to implement efficient join techniques, because relational systems commonly call for joins, face great difficulties in optimizing their efficient execution. The problem arises because inner joins operate both commutatively and associatively. In practice, this means that the user merely supplies the list of tables for joining and the join conditions to use, and the database system has the task of determining the most efficient way to perform the operation. A query optimizer determines how to execute a query containing joins. A conventional query optimizer has two basic freedoms: (1) a join order and (2) a join method. Because joins function commutatively and associatively, the order in which the system joins tables does not change the final result-set of the query. However, join-order does have an enormous impact on the cost of the join operation, so choosing the best join order becomes very important. With regard to the join method, given two tables and a join condition, multiple algorithms can produce the result-set of the join. Algorithms that run most efficiently depend on the sizes of the input tables, the number of rows from each table that match the join condition, and the operations required by the rest of the query. The following is a description of the current subject matter's techniques for optimizing query execution operations in order to make them more efficient.

As stated above, there exist various types of joins, and thus, execution of queries calling for such joins can become an arduous task that involves many phases and subtasks that a system must perform in order to obtain the user-desired data set. In particular, distributed (or repartitioned) joins are most difficult ones, because they require such extra processing. In general, database system developers spend a lot of time optimizing join performance since this is a very common and costly operation. Typically, joins computed within a database system will involve far fewer reads and writes to disk, hence, for performance reasons, the current subject matter's system 100 is configured to compute joins completely inside the database engine deployed on each node 102.

In some embodiments of the current subject matter, for a join to be performed completely inside the database engine, the join can be local in the sense that each node 102 joins data from tables stored locally without transporting any data over the network. Otherwise, if data is to be transported across the network, the join might not be done inside the database engines. A local join can be possible if two tables are hash partitioned on the join attribute (e.g., both an employee and department tables are partitioned on a department id attribute). If so, the single-node database system on each node 102 can compute the join on their partitions of the data without having to worry about joining their partition with partitions stored on other nodes 102 in the cluster 105. In general, local joins can be preferable to more general joins (where data is repartitioned over network based on a join key) since local joins have smaller cost and improved performance of the join.

In order to push as many joins as possible into the single node databases, "aggressive" hash-partitioning is performed (where hash-partitioning is performed based on a value of a hash function that determines membership in a partition; assuming there are four partitions, the hash function could return a value from 0 to 3). When a table is hash-partitioned across multiple nodes, an attribute within the table can be used as the partitioning attribute. However, this limits the degree of co-partitioning when tables are related to each other via many steps of foreign-key/primary-key references. For example, in TPC-H (a Transaction Processing Performance Council ("TPC") standard that defines transaction processing and database benchmarks), a line-item table contains a foreign-key to an order table (via an order key attribute), and the order table contains a foreign-key to a customer table (via a customer key ("custkey") attribute). If the line-item table could be partitioned based on the customer who made the order, then any of the straightforward join combinations of the customer, order, and line-item tables would be local to each node. However, the line-item table does not contain the custkey attribute, making direct partitioning impossible. In this case, referential partitioning is beneficial in that it is configured to execute a join operation with a parent table to retrieve its foreign key during loading of the data.

Figure 11:
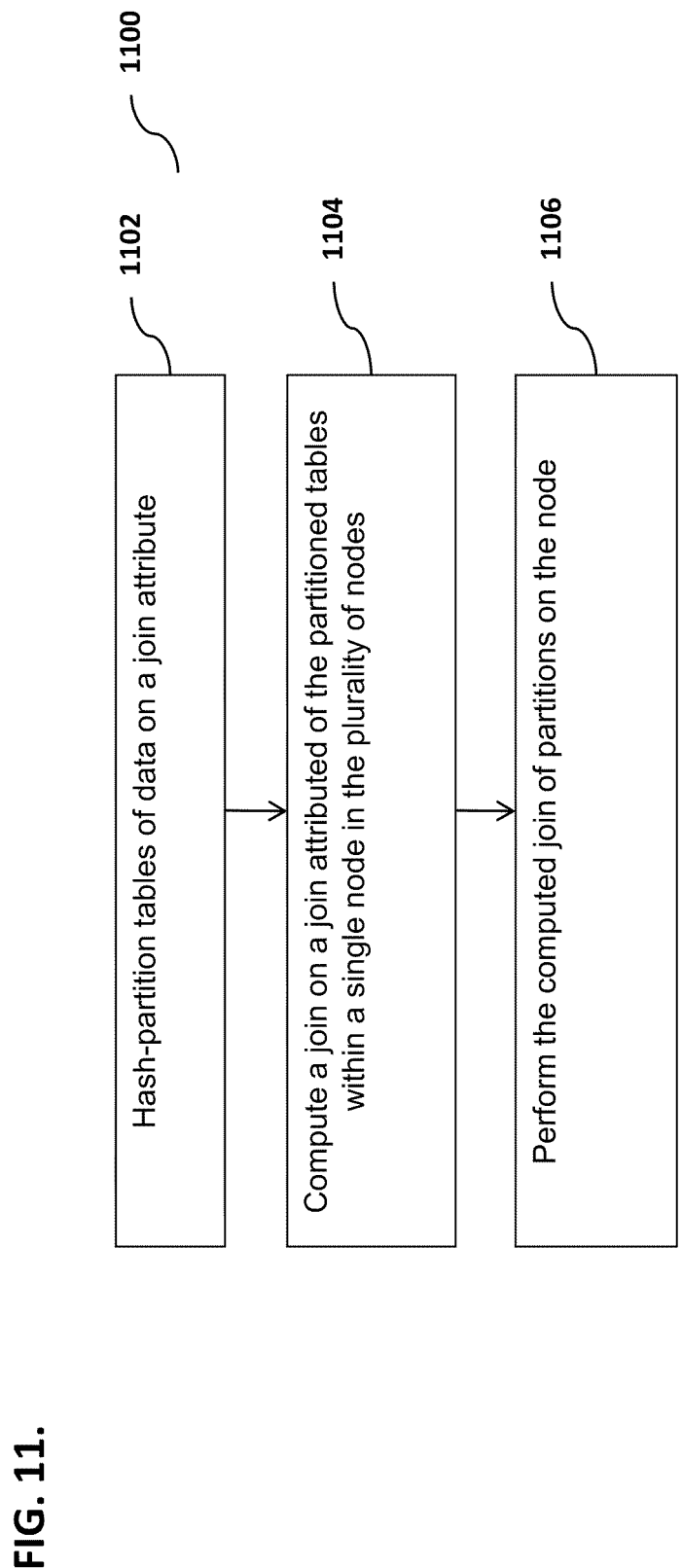
FIG. 11 is a flow chart illustrating an exemplary method, according to some embodiments of the current subject matter.

FIG. 11 is a flowchart illustrating an exemplary method 1100 for processing data that performs a join of various data elements in a database system containing a plurality of nodes, according to some embodiments of the current subject matter. In some embodiments, the data may be stored in tables containing various data attributes (e.g., "custkey" attribute). The method 1100 can be configured to join various partitions of tables on single nodes, i.e., performing local join operation. The method 1100 begins with hash-partitioning tables on a join attribute, which can be predetermined beforehand (at 1102). Then, a join is computed on a join attribute of the partitioned tables within a single node in the plurality of nodes (at 1104). Then, the join of partitions is performed on that node (at 1106). This optimization technique can allow utilization of various references between tables stored in the database system to co-partition related records in such tables. It can further allow computation of joins independently inside databases.

In some embodiments, another join optimization technique is a side-join. One of the uses of the side-join technique is when table collocation is not possible.

Conventional systems implementing MapReduce framework generally perform joins inside the Reduce phase of a MapReduce job. In this case, the Map phase reads each table partition (stored on a particular node) and outputs the join attribute of each tuple as the key and the rest of the tuple as the value. The MapReduce framework then automatically repartitions this output across Reduce tasks such that all tuples with the same join key end up being processed by the same Reduce task. For natural joins and equi-joins, no further network communications is necessary—the Reduce tasks simply perform the join on their partition of the data. This algorithm requires that both tables being joined are repartitioned across nodes. However, there are a variety of cases where it is unnecessary to reparation both tables, and commercial parallel database implementations take advantage of these cases whenever possible. First, if one of the tables is already partitioned by the join key, then only the other table has to be repartitioned using the same partitioning function on the join key that the first table used. After this second table has been repartitioned, the join can proceed locally on each node. Second, if one table is much larger than the other, then even if it is not already partitioned by the join attribute, it can be a good idea to leave it in its original location and simply ship the entire small table to every node in the network. Each partition of the larger table can then be joined with the smaller table on each local node.

In both cases where one of the tables is not repartitioned, the current subject matter's system 100 can be configured to perform a join during an initial processing stage, i.e., task-distribution phase of the query execution plan (e.g., in case of a MapReduce job, such join can be performed during the Map phase of a MapReduce job), so that the join can be performed as the stationary table is read off of disk.

Figure 12:
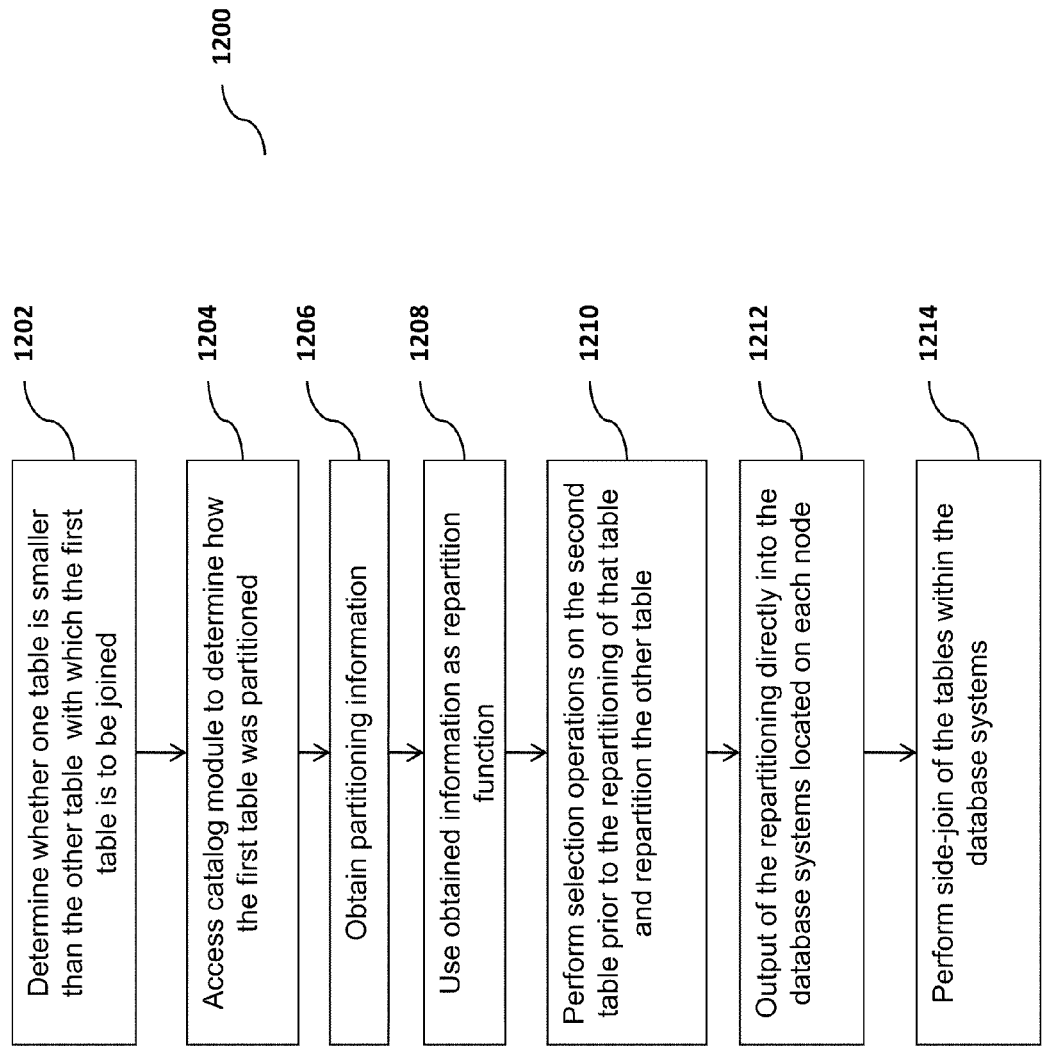
FIG. 12 is a flow chart illustrating another exemplary method, according to some embodiments of the current subject matter.

FIG. 12 is a flow chart illustrating an exemplary method 1200 for processing data, according to some embodiments of the current subject matter. In some embodiments, in the event where one table (e.g., a smaller table) can be already partitioned on the join attribute and the other table (e.g., a larger table) can be repartitioned on that same attribute, the method 1200 can be configured to repartition the second table. As shown at 1202, the system 100 can initially determine whether one table (e.g., a first table) is smaller than the other table (e.g., a second table) with which the first table is to be joined. At 1204, the catalog module can be accessed to determine how the first table was partitioned. At 1206, the obtained partitioning information or function can be used as a repartition function (at 1208). In some embodiments, any selection operations on the second table can be performed prior to the repartitioning of that table (at 1210). Once the repartitioning is complete (at 1210), the system 100 can be configured to write an output of this repartitioning directly into the database systems located on each node (at 1212). The system 100 can include an output format module that is configured to prepare resulting date for output. Once both tables are partitioned on the same attribute, the side join of the tables can be performed by entirely within the database systems (at 1214).

In some embodiments, when one table is smaller than the other table, the smaller table is broadcast to all nodes 102 in order to avoid repartitioning of the bigger table. The smaller table is read into memory and then stored in a hash table or other temporary memory. Then, partition of the large table is read and sequentially compared to the hash table (this is similar to a standard hash-join). Since each local partition of a table is divided into many chunks, and each chunk can be processed differently or using different tasks. Thus, the smaller table is appropriately joined with the larger table at the nodes 102 using partitioning attributes.

In some embodiments, if a MapReduce framework is implemented, the system 100 can be configured to perform joins during Map phases of the MapReduce tasks, wherein such joins can be referred to as map-side joins. As can be understood by one skilled in the art, other data processing frameworks can be used to perform joins discussed above.

Another query execution strategy can be to perform a side split semi-join, which involves splitting execution of a join into various phases of the query task or splitting the execution between different tasks (e.g., when using a MapReduce framework, execution of the side split semi join can be split between two separate Map phases of two MapReduce jobs). In this embodiment, initially, the system 100 can be configured to perform any column selections operations on a particular table as well as determine (project) a join attribute for that table. Once a column is selected, it can be repartitioned using the side-join technique discussed above. If the projected column is very small (for example, the key from a dictionary table or a table after applying a very selective predicate), the side join is replaced with a selection predicate (e.g., using an SQL clause 'foreignKey IN (listOfValues)') and pushed into the DBMS. This allows the join to be performed completely inside the database system without first loading the data into a temporary table inside the DBMS.

The side split semi-join is useful when there is a need to project other attributes from tables (e.g., dictionary tables). This typically occurs at the very end of the query plan, right before outputting the results. The integer identifiers that were carried through the query execution, are replaced by actual text values (for example, the names of the nations).

In some embodiments, the current subject matter's system implements a post-join aggregation as another technique for optimizing query execution. In this embodiment, the current subject matter is configured to push aggregation operations (in cases when they do not conflict with a join) into the database engine. Conventional systems do not appear to have a standard way to perform post-join aggregation. Aggregation can be typically performed when the repartitioning is performed using a partitioning key that is the same as the data-grouping key (a group-by attribute), i.e., the key which is used to group the table data. If, however, the partitioning was done on a join key, in order to join partitions from two different tables, then a new partitioning can be performed to perform the aggregation since, in general, the group-by attribute is different than the join keys. The new partitioning can require additional processing tasks to be performed, thereby causing associated overhead.

Figure 5:
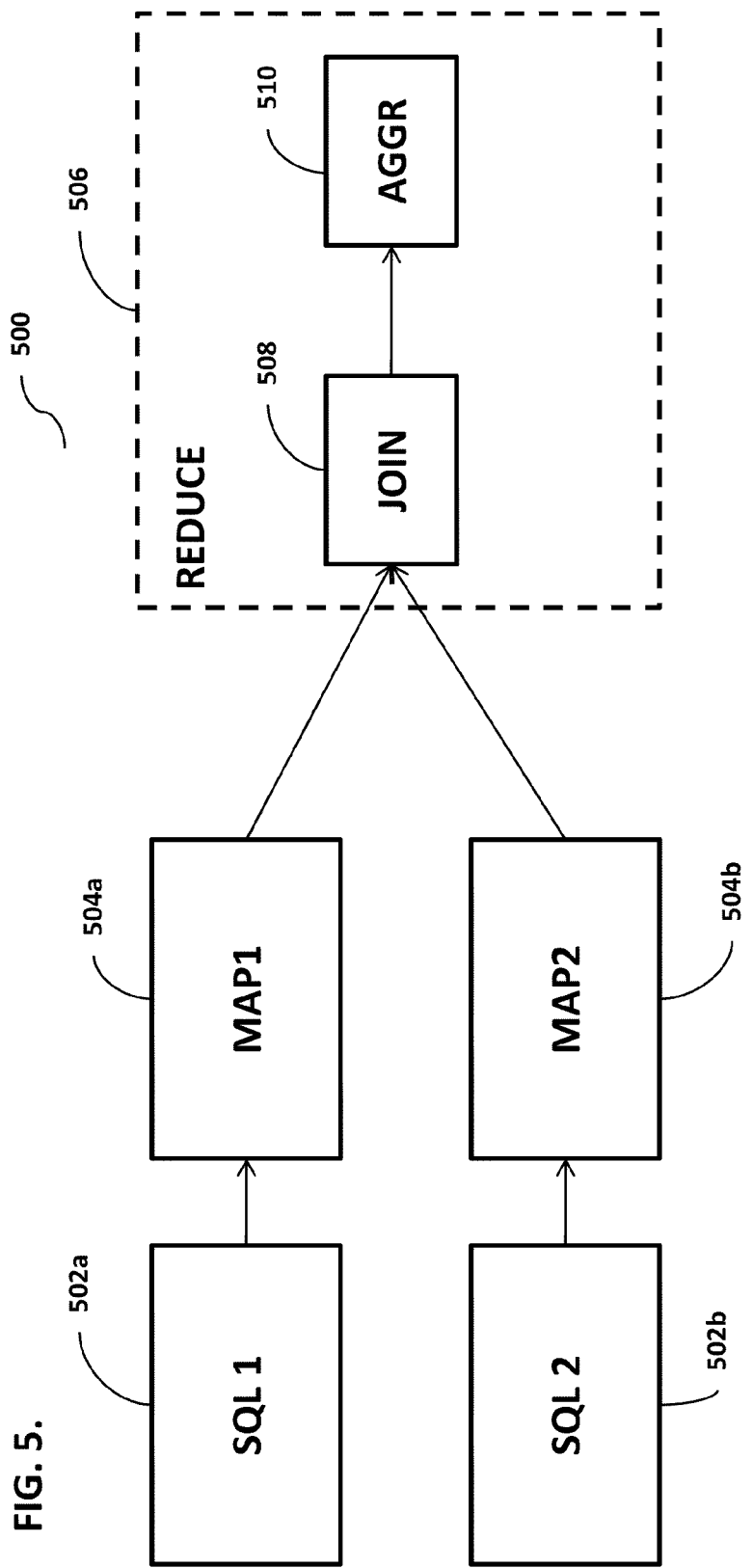
FIG. 5 is a flow chart illustrating an exemplary post-join aggregation, according to according to some embodiments of the current subject matter.

To resolve this problem, the current subject matter performs a hash-based partial aggregation (if the MapReduce framework is implemented, such partial aggregation is performed at the end of the Reduce phase task). Then, a group-by attribute can be extracted and used to probe the stored hash table in order to find the appropriate running aggregation that the obtained result should contribute to (i.e., finding data stored in the hash table that can be used to join with the obtained result). In embodiments using MapReduce framework, this can save significant I/O processing time, since the output of Reduce tasks are written redundantly into HDFS (as opposed to the output of Map tasks which are only written locally to the node that ran the Map task). Hence, by outputting partially aggregated data instead of raw values, much less data must be written to HDFS. FIG. 5 illustrates an exemplary post-join aggregation operation 500, according to some implementations of the current subject matter. Queries (e.g., SQL queries) 502(a, b) can be received and processed during a Map phase ("Map1" 504a, and "Map2" 504b, respectively). Then, the processing of queries proceeds to a Reduce phase 506. During the Reduce phase 506, the queries can be joined using a join operation 508 and then aggregated using an aggregation procedure 510.

Figure 6:
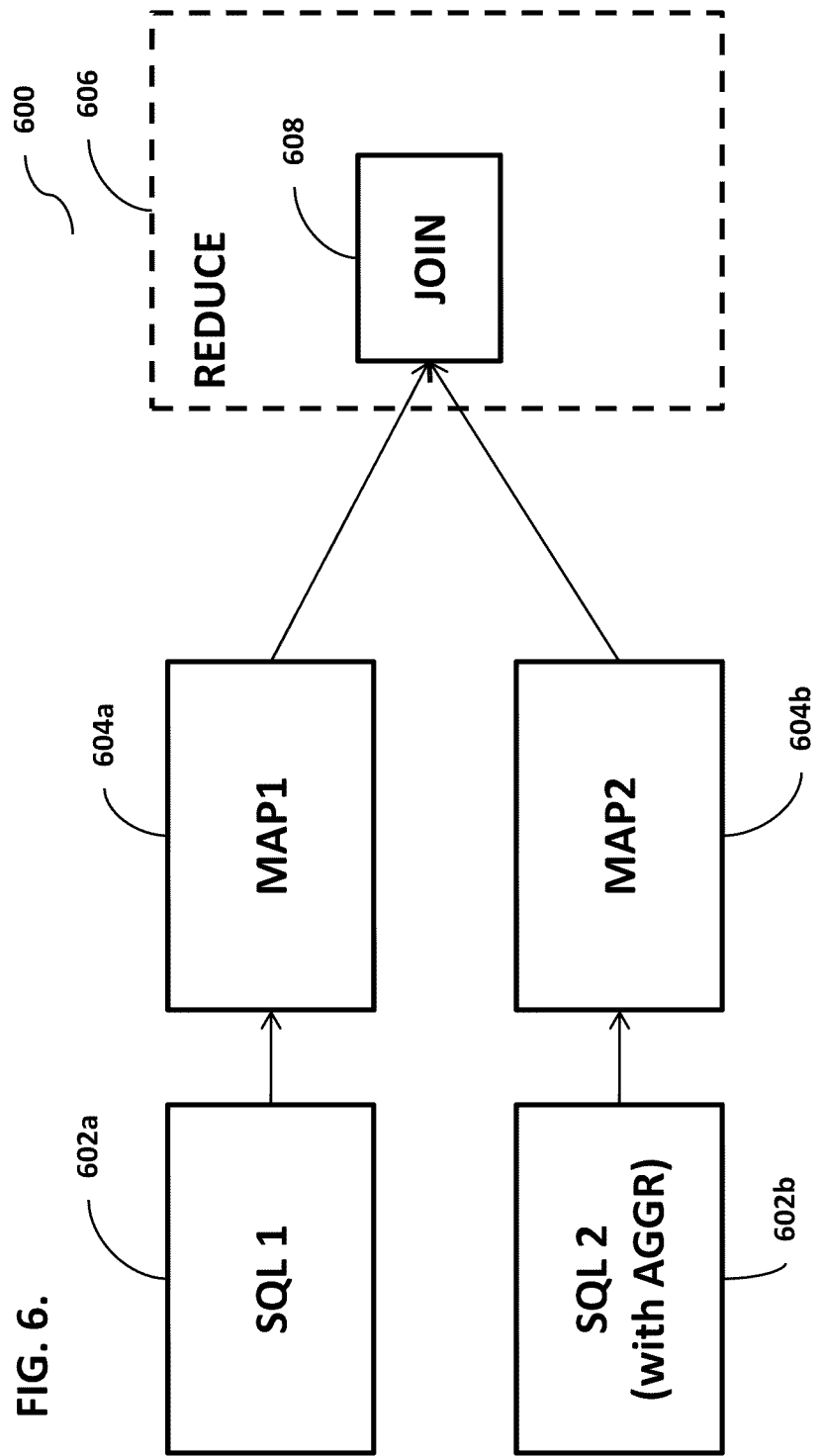
FIG. 6 is a flow chart illustrating an exemplary pre-join aggregation, according to some embodiments of the current subject matter.

In some embodiments, the current subject matter is configured to perform pre join aggregation techniques can be used to optimize query execution. In these embodiments, aggregations that can be performed after a join in most database systems, are transformed into partial aggregation operators and computed before a join. This is happens when the join cannot be pushed into the database system (for example, via collocated joins or the side-joins). When the product of the cardinalities of the group-by and join-key columns is smaller than the cardinality of the entire table, it becomes beneficial to push the aggregation past the join so that it can be performed inside the faster database systems. Obviously, some of those aggregates might be later dropped because they do not join with the records of the other table but this might be an acceptable trade-off in order to save I/O and network traffic. FIG. 6 illustrates an exemplary pre-join aggregation procedure 600, according to some implementations of the current subject matter. During the Map phase ("Map1" 604a and "Map2" 604b), queries 602a and 602b are received (e.g., SQL queries), where query 602b includes an aggregate function. Inclusion of an aggregate function in the SQL query 602b can indicates that aggregation of queries is to occur prior to the Reduce phase 508 and prior to the join 610 that occurs during the Reduce phase 508.

EXAMPLES

The following discussion illustrates some of the experiments in query execution optimization conducted by the present application's inventors. The discussion includes an outline of experimental benchmark systems setup, data loading procedures, followed by an analysis of results. These examples are provided for illustrative purposes only and are not intended to limit the current subject matter in any way.

A. Experimental Setup

The following is a discussion of three benchmarked systems, including the system 100, that have been used in these examples. All three systems were deployed on a 45-node cluster. Each node had a single 2.40 GHz Intel Core 2 Duo processor running 64-bit Red Hat Enterprise Linux 5 (kernel version 2.6.18) with 4 GB RAM and two 250 GB SATA-I hard disks. According to hdparm, the hard disks deliver 74 MB/sec for buffered reads. All nodes were on the same rack, connected via 1 Gbps network to a Cisco Catalyst 3750E-48TD switch.

1. DBMS-X

A recent release of DBMS-X, a parallel SQL DBMS from a major relational database vendor was used. There is a TPC-H benchmark report, performed by the DBMS-X vendor, available on the TPC website (http://www.tpc.org/tpch/default.asp), which used the same release of DBMS-X installed. Therefore, as much as possible, the installation of DBMS-X was configured using parameters specified in the report. However, the vendor ran its benchmarks on a cluster with considerably more RAM and drives per node than the experimental cluster, thus some parameters were scaled down to reflect system resources. The system was installed on each node and configured to use 4 GB shared memory segments for the buffer pool and other temporary space. Furthermore, because all of the benchmarks were read-only and replication features in DBMS-X were not enabled, since this would not have improved performance and would have complicated the installation process.

2. Hive and Hadoop

Hive version 0.4.1 and Hadoop version 0.19.2, running on Java1.6.0 were used. Both systems were configured according to suggestions described by members of Hive's development team in their report on running TPC-H on Hive (http://issues.apache.org/jira/browse/HIVE-600). To reflect system's hardware capacity, the number of map and reduce slots was adjusted to 2. In addition, HDFS block size was set to 256 MB. Compression of query intermediate data with the LZO native library version 2.03 was enabled.

3. Current Subject Matter's System 100

Portions of system 100 can be configured similarly as stated above except for the number of task slots, which was set to one. Thus, on each worker node, processes can use up to 2 GB of RAM. The other half of system's memory can be designated to the Ingres VectorWise DBMS, which was installed on each machine independently. Out of this memory, the buffer pool can be set to 400 MB and the rest can be available for query processing. All other parameters of database servers can remain unchanged. HadoopDB communicated with IVW using the standard JDBC driver shipped with Ingres. An early version of the Ingres VectorWise (IVW) system (http://www.ingres.com/vectorwise; http://www.vectorwise.com), based on the X100 research project (see, M. Zukowski, "Balancing Vectorized Query Execution with Bandwidth-Optimized Storage", Ph.D. Thesis, Universiteit van Amsterdam, Amsterdam, The Netherlands, 2009). IVW provides high performance in analytical queries due to vectorized operations on in-cache data and efficient I/O. The unique feature of the VectorWise (VW) database engine is its ability to take advantage of modern CPU capabilities such as SIMD instructions, commonly used in multimedia computation. This allows a data processing operation (such as a predicate evaluation) to occur on multiple values from a column simultaneously (on the same processor). Furthermore, in contrast to the tuple-at-a-time iterators traditionally employed by database systems, VW processes many values (typically vectors of length 1024) at once. Moreover, VectorWise makes an effort to keep the processed vectors in cache to reduce unnecessary RAM access. In the storage layer, Ingres VectorWise is a flexible column-store which allows to avoid reading attributes not needed in a query. To further reduce I/O bottleneck, automatic lightweight compression was applied. Finally, clustering indices and the exploitation of data correlations through sparse MinMax indices allow even more savings in I/O.

4. TPC-H Benchmark System

TPC-H (See, e.g., http://www.tpc.org/tpch) is a decision support benchmark that consists of a set of complex business analysis queries. The dataset models a global distribution company and includes the following tables: nation, region, supplier, part, partsupp, customer, orders, and lineitem. The benchmark ran at scaling factor SF=3000 (about 3 TB).

B. Data Preparation and Loading

The 3 TB of TPC-H benchmark data were generated using the dbgen program provided by TPC, running in parallel on every node. Each of the 45 nodes in the cluster received about 76 GB of raw data.

1. DBMS-X

According to the DBMS-X vendor suggestions, the DDL scripts from their TPC-H report were used to create the tables and indices, and to define the data distribution. All tables were hash-partitioned on their primary key, except for the partsupp table, which is hash-partitioned on the part key column, and the lineitem and orders tables, which were range-partitioned by month. The supplier and customer relations were indexed on their respective nation keys, as well as their primary key. The loading process included two steps. First, data was repartitioned and shuffled; second, the repartitioned data was bulk-loaded on each node. The DBMS-X loading utility, which was invoked on each node, directly consumed and transformed the data produced by the TPC-H data generator. The partitioning phase proceeded in parallel, but DBMS-X serialized each load phase and did not make full use of the disk bandwidth available to it. DBMS-X total load time was 33 h 3 min.

2. Hive and Hadoop

Hadoop's filesystem utility ran in parallel on all nodes and copied unaltered data files into HDFS under a separate directory for each table. Each file was automatically broken into 256 MB blocks and stored on a local data node. In addition, Hive DDL scripts were executed to put relational mapping on the files. The entire process took only 49 minutes.

3. Current Subject Matter's System 100

System 100 can also be loaded raw data into HDFS. Then, system 100's data loader utilities (implemented as MR jobs) performed global hash-partitioning across the cluster of each data file. In the case of the lineitem table, this two-operation process involved a join with the orders table to retrieve the customer key attribute needed for referential partitioning. Next, each node downloaded its partitions into a local file system. Finally, each group of collocated tables was broken into smaller chunks, which observe referential integrity constraints, with the maximum size of 3.5 GB. The entire partitioning process took 11 h4 min with referential hash-partitioning was the most expensive part (6 h 42 min).

The chunked files were bulk-loaded in parallel into each instance of the Ingres VectorWise server using standard SQL COPY command. During this process data were also sorted according to the clustering index and IVW's internal indices were created. In the last step, the Ingres' optimizedb tool was run to generate statistics and histograms that would be used by the Ingres optimizer during query execution. Loading data into the databases took 3 h 47 min.

The data layout was as follows. The customer, orders, and lineitem tables were partitioned by the customer key and clustered by the nation key, order date, and order key, respectively. The part key attribute was used to both hash-partition and cluster the part and partsupp tables. The supplier table was partitioned by its primary key and clustered on the nation key. Small dictionary tables, region and nation, were not partitioned but collocated on one node (even though they are very small, they were not replicated since this violates TPC-H benchmarking rules). Their clustering indices were created using the region key attribute.

C. Benchmark System Query Execution

The above-referenced systems were tested against standard TPC-H queries from 1 to 20 (some of which are shown below). For DBMS-X and Hive, the queries were executed as specified in the appropriate reports for these systems. Since HiveQL syntax is a subset of SQL, in many cases the original TPC-H queries were rewritten into a series of simpler queries that in the last step produce the desired output. The current subject matter's system 100 implemented the queries using its API to ensure the employment of the execution strategies we discuss in this paper. All queries were parameterized using substitution values specified in the TPC-H report for query validation.

D. Results

Figure 7:
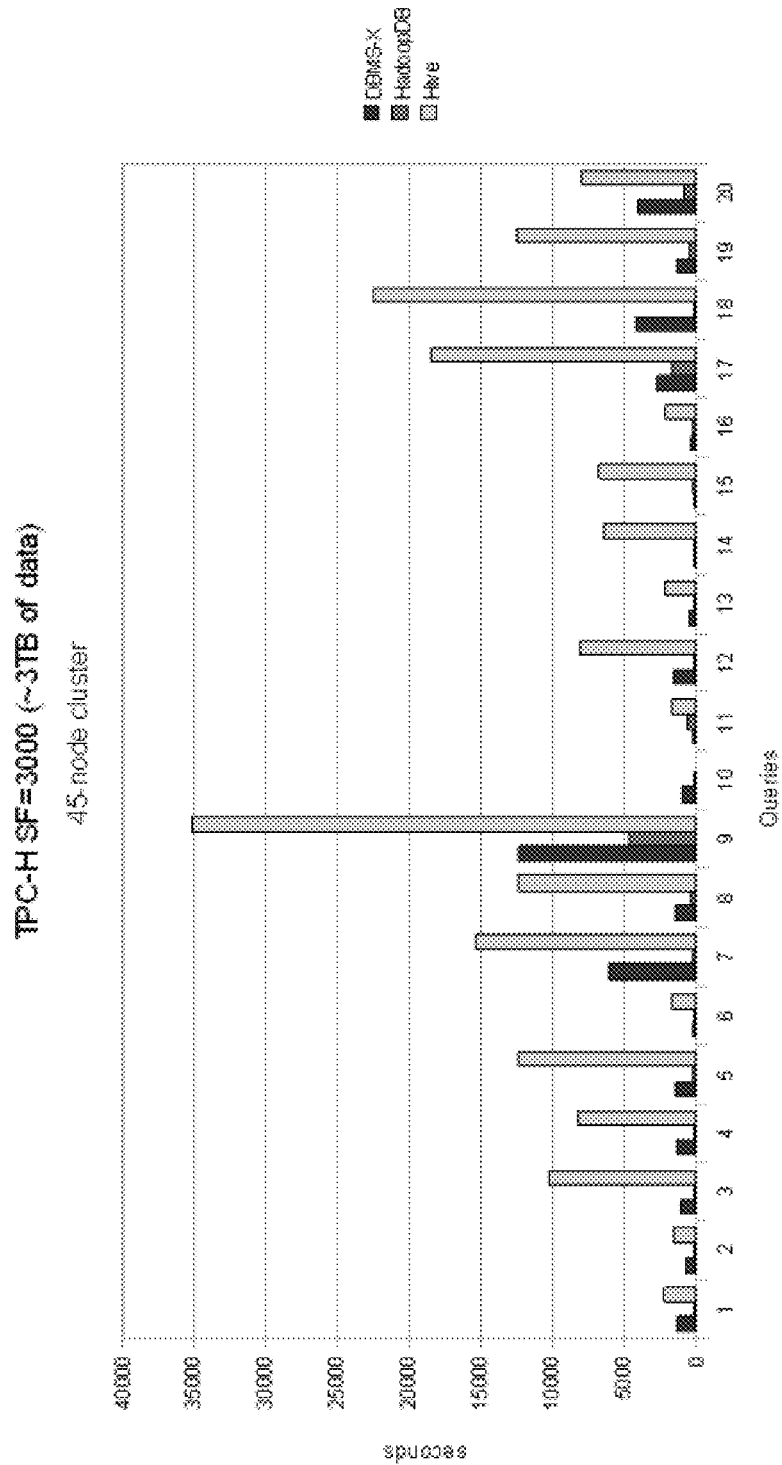
FIG. 7 is a plot illustrating comparison of execution of various TPC-H Queries using the system shown in FIG. 1 and other benchmarked systems.

FIG. 7 is a plot illustrating results of this benchmarking for all three experimental systems discussed above. The DBMS-X outperformed Hive in all queries. The main reason for the inferior performance of Hive was the lack of partitioning and indexing that helps during query execution. As a result of this limitation, every selection becomes a full data scan and most of the joins involved repartitioning and shuffling all records across the cluster.

As shown in FIG. 7, performance of the current subject matter's system was an order of magnitude faster than the parallel database systems. By leveraging highly optimized column-store single-node database systems and carefully generating query execution plans adjusted to the MapReduce framework, system 100 outperformed DBMS-X by a factor of 7.5 on average. Hive-based system performed on average 40 times slower than system 100. The following is a discussion of some of the TPC-H queries performed and their results.

1. Query 5

Figure 8:
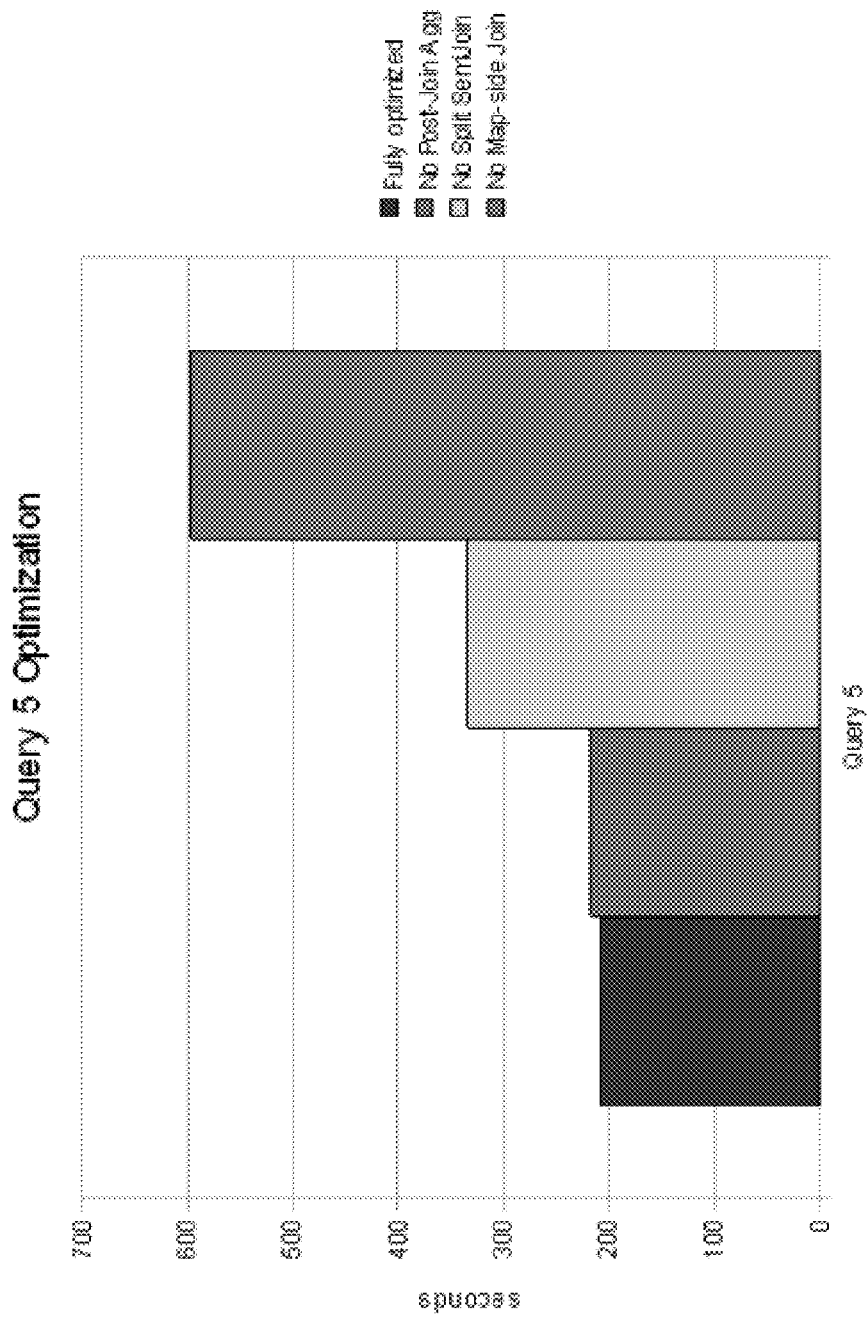
FIG. 8 is a plot illustrating comparison of execution of various TPC-H Query 5 using the system shown in FIG. 1 and other benchmarked systems.

The TPC-H Query 5 was executed in accordance with the following (FIG. 8 is a plot illustrating the query running time with each optimization turned off one by one):

```
select
    n_name,
    sum(l_extendedprice * (1 − l_discount)) as revenue
```

```
        from
            customer,
            orders, lineitem,
            supplier,
            nation, region
        where
            c_custkey = o_custkey
            and l_orderkey = o_orderkey
            and l_suppkey = s_suppkey
            and c_nationkey = s_nationkey
            and s_nationkey = n_nationkey
            and n_regionkey = r_regionkey
            and r_name = 'ASIA'
            and o_orderdate >= date '1994-01-01'
            and o_orderdate < date '1994-01-01'
                + interval '1' year
        group by
            n_name
        order by
            revenue desc
```

Query 5 involved joining six tables: customer, orders, lineitem, supplier, nation, and region. The fully optimized version used referential partitioning, split semijoin, and post-join aggregation. It involve one repartitioned join (the join with the supplier table). The implementation of this query included two MapReduce jobs, the first one performed the join and partial aggregation and the second job computed the global sum of revenue per nation.

During execution, the first optimization technique that was turned off was the post-join aggregation on the nation key. The amount of data that was written to HDFS between the two jobs increased from 5.2 KB to 83.8 MB. The effect on query running time was insignificant.

The next optimization that was turned off was the split semijoin technique (used for the joins of both the customer and supplier tables with the nation and region tables). System 100 therefore replaced the split semijoin with a regular Map-side join. This resulted in about 50% slowdown. The reason was that now the joins were performed outside of the database system (and could not take advantage of clustering indices on the nation key).

Finally, the Map-side join was turned off and replaced with the standard repartitioned join done in the Reduce phase. Now, the query running time doubled relative to the Map-side join and reached approximately a factor of 3 slowdown versus the fully optimized version. The entire operation of joining all the tables was achieved within one MR job, in view of the fact that the dictionary tables were brought into memory using the SideDB extension.

2. Query 7

Query 7 was executed as follows:

```
select
    supp_nation,
    cust_nation,
    l_year,
    sum(volume) as revenue
from
    (
        select
            n1.n_name as supp_nation,
            n2.n_name as cust_nation,
            extract(year from l_shipdate) as l_year,
            l_extendedprice * (1 - l_discount) as volume
        from
            supplier,
            lineitem,
            orders,
            customer,
            nation n1,
            nation n2
        where
            s_suppkey = l_suppkey
            and o_orderkey = l_orderkey
            and c_custkey = o_custkey
            and s_nationkey = n1.n_nationkey
            and c_nationkey = n2.n_nationkey
            and (
                (n1.n_name = 'FRANCE' and n2.n_name =
                    'GERMANY')
                or (n1.n_name = 'GERMANY' and n2.n_name =
                    'FRANCE')
            )
            and l_shipdate between date '1995-01-01'
                and date '1996-12-31'
    ) as shipping
group by
    supp_nation,
    cust_nation,
    l_year
order by
    supp_nation,
    cust_nation,
    l_year
```

This query involved joining 5 tables and computing per year aggregates of revenue volume between two chosen nations. Compared to DBMS-X, system 100 performed more joins locally because of referential partitioning and split semijoins (between the nation table and both customer and supplier tables). System 100 performed one repartitioned join, but after selective predicates on both groups of collocated tables. Overall, system 100 outperformed both DBMS-X (by a factor of 29) and Hive (by a factor of 74).

3. Query 8

Figure 9:
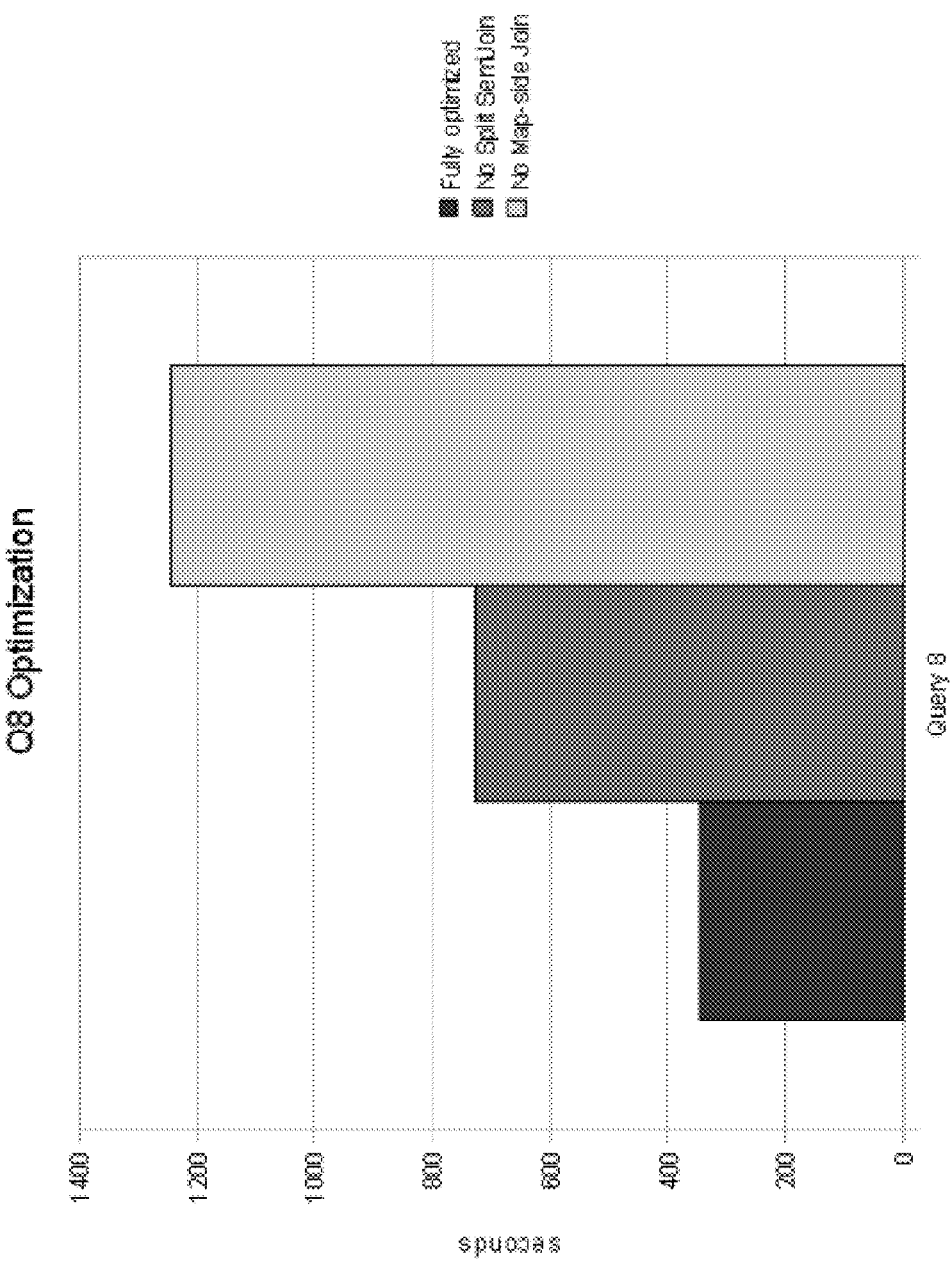
FIG. 9 is a plot illustrating comparison of execution of various TPC-H Query 8 using the system shown in FIG. 1 and other benchmarked systems.

FIG. 9 is a plot illustrating the results Query 8, which was executed in accordance with the following:

```
select
    o_year,
    sum(case
        when nation = 'BRAZIL' then volume
        else 0
    end) / sum(volume) as mkt_share
from
    (
        select
            extract(year from o_orderdate) as o_year,
            l_extendedprice * (1 - l_discount) as volume,
            n2.n_name as nation
        from
            part,
            supplier,
            lineitem,
            orders,
            customer,
            nation n1,
            nation n2,
            region
        where
            p_partkey = l_partkey
            and s_suppkey = l_suppkey
            and l_orderkey = o_orderkey
            and o_custkey = c_custkey
            and c_nationkey = n1.n_nationkey
            and n1.n_regionkey = r_regionkey
            and r_name = 'AMERICA'
            and s_nationkey = n2.n_nationkey
            and o_orderdate between date '1995-01-01'
                and date '1996-12-31'
            and p_type = 'ECONOMY ANODIZED STEEL'
    ) as all_nations
```

-continued

```
group by
    o_year
order by
    o_year
```

Similarly to Query 5, in Query 8, the join operation was moved to a later stage within a MapReduce job and thus, decreased performance. In executing this query, employing split semijoin (to restrict nations to those from the region of America) gave a factor of 2 speedup over the Map-side join and a factor of 3.6 over Reduce join. In particular, switching to the Map-side join resulted in a total of 5.5M of rows returned by all the databases combined (5 times more than in the split semi-join version). In both the split semijoin and the regular Map-side join cases, the same amount of intermediate data was written to disk between the Map and Reduce phases (around 315 GB). When performing a repartitioned join in the Reduce phase, the Hadoop job statistics page reports the total of 1.7 TB data written to local disks (which also needs to be shuffled across all the nodes).

4. Query 9

The TPC-H Query 9 was performed using the following code:

```
select
    nation,
    o_year,
    sum(amount) as sum_profit
from
    (
    select
        n_name as nation,
        extract(year from o_orderdate) as o_year,
        l_extendedprice * (1 − l_discount)
            − ps_supplycost * l_quantity as amount
    from
        part,
        supplier,
        lineitem,
        partsupp,
        orders,
        nation
    where
        s_suppkey = l_suppkey
        and ps_suppkey = l_suppkey
        and ps_partkey = l_partkey
        and p_partkey = l_partkey
        and o_orderkey = l_orderkey
        and s_nationkey = n_nationkey
        and p_name like '%green%'
    ) as profit
group by
    nation,
    o_year
order by
    nation,
    o_year desc
```

This query posed difficulties for each benchmarked system. Six tables were joined and there was only one selection predicate (on part table) to reduce the size of the data. Thus, the query involved scanning most of the data and shuffling it over the network in order to compute joins. Current subject matter's system 100 performed best because it used a column-store technique to avoid reading all columns off disk, and also because it was able to push three out of five joins into the local databases. This translated into a 2.66 shorter query running time when compared to DBMS-X, which in turn, outperformed Hive by a factor of 2.8.

5. Query 17

Figure 10:
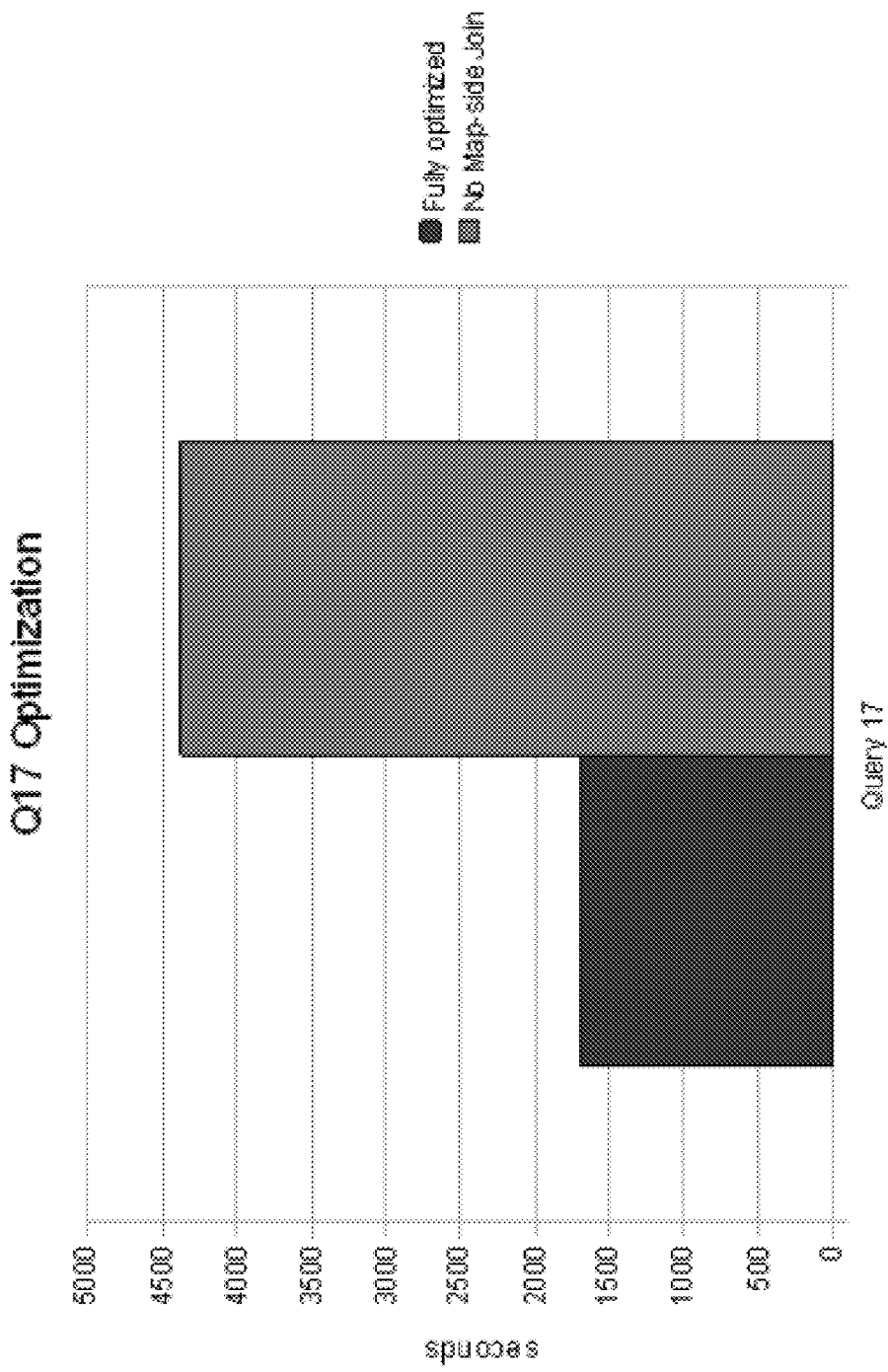
FIG. 10 is a plot illustrating comparison of execution of various TPC-H Query 17 using the system shown in FIG. 1 and other benchmarked systems.

Query 17's results are illustrated in FIG. 10. The query's code is as follows:

```
select
    sum(l_extendedprice) / 7.0 as avg_yearly
from
    lineitem,
    part
where
    p_partkey = l_partkey
    and p_brand = 'Brand#23'
    and p_container = 'MED BOX'
    and l_quantity < (
        select
            0.2 * avg(l_quantity)
        from
            lineitem
        where
            l_partkey = p_partkey
    )
```

Query 17 involved a join between the lineitem and part tables which were not collocated. This query involved repartitioning both tables and performing the join in Reduce. Very selective predicates were applied to the part table (69 GB of raw data), resulting in only 22 MB of data after the predicate was applied. Thus, the current subject matter's system broadcasted the result of the selection query on the part table to all nodes and employed the Map-side technique. In this way, HadoopDB avoided repartitioning the lineitem table. The gain was over a factor of 2.5 in total running time, as shown in FIG. 4.

6. Query 18

Finally, Query 18 was executed using the following:

```
select
    first 100 c_name,
        c_custkey,
        o_orderkey,
        o_orderdate,
        o_totalprice,
        sum(l_quantity)
from
    customer,
    orders,
    lineitem
where
    o_orderkey in (
        select
            l_orderkey
        from
            lineitem
        group by
            l_orderkey having
                sum(l_quantity) > 300
    )
    and c_custkey = o_custkey
    and o orderkey = l_orderkey
group by
    c_name,
    c_custkey,
    o_orderkey,
    o_orderdate,
    o_totalprice
order by
    o_totalprice desc,
    o_orderdate
```

In this query system 100 again outperformed the two other systems. In the case of DBMS-X, the running time was 28.8 times longer than current subject matter's system. Hive was beaten by a factor of 151. System 100's highly efficient execution plan for this query benefits greatly from the referential partitioning (both the join and the subquery of per order threshold on sum of lineitems quantity can be computed locally), resulting in having only one MR job to produce the desired output. DBMS-X and Hive both do repartitioned joins.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, i.e., one or more computer programs tangibly embodied in a machine-readable storage device, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Some of the essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

Example embodiments of the methods and components of the current subject matter have been described herein. As noted elsewhere, these example embodiments have been described for illustrative purposes only, and are not limiting. Other embodiments are possible and are covered by the invention. Such embodiments will be apparent to persons skilled in the relevant art(s) based on the teachings contained herein. Thus, the breadth and scope of the current subject matter should not be limited by any of the above-described exemplary embodiments, but should be defined only in accordance with the following claims and their equivalents.

What is claimed:

1. A method for processing data in a database system containing a plurality of nodes, the method comprising the steps of:

receiving a query for processing of data, wherein the data is stored in a first table in a plurality of tables, wherein the first table is stored on at least one node within the database system;

determining an attribute of the first table and second table in the plurality of tables, the attribute including a join key, the first table having a smaller size than the second table, wherein the second table is partitioned into a plurality partitions, and at least one partition of the second table is stored on at least one node within the database system;

providing the first table to each node in the database system storing at least one partition of the second table; and joining, on each node storing at least one partition of the second table, the first table and at least one partition of the second table using the determined attribute;

wherein a map phase in a plurality of map phases of a MapReduce process includes the determining, the providing, and the joining, the MapReduce process including a plurality of map phases and reduce phases, and a reduce phase in the plurality of reduce phases includes aggregating data generated as a result of the joining and, optionally, performing at least one operation on the generated data;

each partition of the second table is joined with the first table during a different map processing task in the plurality of map processing tasks of a MapReduce process.

2. The method according to claim 1, wherein the providing further comprises storing the first table in a temporary memory location.

3. The method according to claim 2, wherein the joining further comprises
obtaining at least one partition of the second table;
accessing the temporary memory location to obtain the first table; and
joining the accessed first table and the obtained partition of the second table using the determined attribute.

4. The method according to claim 1, wherein the first table is a dictionary table.

5. A system for processing data in a database system containing a plurality of nodes, comprising:
at least one programmable processor; and
at least one memory including code that, when executed by at least one programmable processor, cause the at least one programmable processor to perform operations comprising:
receiving a query for processing of data, wherein the data is stored in a first table in a plurality of tables, wherein the first table is stored on at least one node within the database system;
determining an attribute of the first table and second table in the plurality of tables, the attribute including a join key, the first table having a smaller size than the second table, wherein the second table is partitioned into a plurality partitions, and at least one partition of the second table is stored on at least one node within the database system;
providing the first table to each node in the database system storing at least one partition of the second table; and
joining, on each node storing at least one partition of the second table, the first table and at least one partition of the second table using the determined attribute;
wherein
a map phase in a plurality of map phases of a MapReduce process includes the determining, the providing, and the joining, the MapReduce process including a plurality of map phases and reduce phases, and
a reduce phase in the plurality of reduce phases includes aggregating data generated as a result of the joining and, optionally, performing at least one operation on the generated data;
each partition of the second table is joined with the first table during a different map processing task in the plurality of map processing tasks of a MapReduce process.

6. The system according to claim 5, wherein the providing further comprises storing the first table in a temporary memory location.

7. The system according to claim 6, wherein the joining further comprises
obtaining at least one partition of the second table;
accessing the temporary memory location to obtain the first table; and
joining the accessed first table and the obtained partition of the second table using the determined attribute.

8. The system according to claim 5, wherein the first table is a dictionary table.

9. A non-transitory computer-readable medium including code that, when executed by at least one programmable processor, cause the at least one programmable processor to perform operations comprising:
receiving a query for processing of data, wherein the data is stored in a first table in a plurality of tables, wherein the first table is stored on at least one node within the database system;
determining an attribute of the first table and second table in the plurality of tables, the attribute including a join key, the first table having a smaller size than the second table, wherein the second table is partitioned into a plurality partitions, and at least one partition of the second table is stored on at least one node within the database system;
providing the first table to each node in the database system storing at least one partition of the second table; and
joining, on each node storing at least one partition of the second table, the first table and at least one partition of the second table using the determined attribute;
wherein
a map phase in a plurality of map phases of a MapReduce process includes the determining, the providing, and the joining, the MapReduce process including a plurality of map phases and reduce phases, and
a reduce phase in the plurality of reduce phases includes aggregating data generated as a result of the joining and, optionally, performing at least one operation on the generated data;
each partition of the second table is joined with the first table during a different map processing task in the plurality of map processing tasks of a MapReduce process.

10. The non-transitory computer-readable medium according to claim 9, wherein the providing further comprises storing the first table in a temporary memory location.

11. The non-transitory computer-readable medium according to claim 10, wherein the joining further comprises
obtaining at least one partition of the second table;
accessing the temporary memory location to obtain the first table; and
joining the accessed first table and the obtained partition of the second table using the determined attribute.

12. The non-transitory computer-readable medium according to claim 9, wherein the first table is a dictionary table.

13. A method for processing data in a database system containing a plurality of nodes, the method comprising the steps of:
receiving a query for processing of data, wherein the data is stored in a table in a plurality of tables, wherein the table is stored on at least one node within the database system;
determining whether a first table in the plurality of tables is partitioned by a join attribute, the join attribute including a join key, wherein a second table in the plurality of tables is not partitioned by the join attribute;
partitioning the second table using the join attribute into a plurality of partitions, wherein the partitioning of the second table is performed during a first processing task in the plurality of processing tasks;
providing a partition of the second table to each node in the database system storing a partition of the first table; and
joining, on each node, one or more partitions of the first table and one or more corresponding partitions of the second table based on the join attribute during a second processing task in the plurality of processing tasks;
wherein the first and second processing tasks are map phases of a MapReduce process, a map phase in a plurality of map phases of a MapReduce process includes the determining, the partitioning, the providing, and the joining, the MapReduce process including a plurality of map phases and reduce phases, and a reduce phase in the plurality of reduce phases includes aggregating data generated as a result of the joining and, optionally, performing at least one operation on the generated data.

14. A system for processing data in a database system containing a plurality of nodes, comprising:
at least one programmable processor; and
at least one memory including code that, when executed by at least one programmable processor, cause the at least one programmable processor to perform operations comprising:
receiving a query for processing of data, wherein the data is stored in a table in a plurality of tables, wherein the table is stored on at least one node within the database system;
determining whether a first table in the plurality of tables is partitioned by a join attribute, the join attribute including a join key, wherein a second table in the plurality of tables is not partitioned by the join attribute;
partitioning the second table using the join attribute into a plurality of partitions, wherein the partitioning of the second table is performed during a first processing task in the plurality of processing tasks;
providing a partition of the second table to each node in the database system storing a partition of the first table; and
joining, on each node, one or more partitions of the first table and one or more corresponding partitions of the second table based on the join attribute during a second processing task in the plurality of processing tasks;
wherein
the first and second processing tasks are map phases of a MapReduce process,
a map phase in a plurality of map phases of a MapReduce process includes the determining, the partitioning, the providing, and the joining, the MapReduce process including a plurality of map phases and reduce phases, and
a reduce phase in the plurality of reduce phases includes aggregating data generated as a result of the joining and, optionally, performing at least one operation on the generated data.

15. A non-transitory computer-readable medium including code that, when executed by at least one programmable processor, cause the at least one programmable processor to perform operations comprising:
receiving a query for processing of data, wherein the data is stored in a table in a plurality of tables, wherein the table is stored on at least one node within the database system;
determining whether a first table in the plurality of tables is partitioned by a join attribute, the join attribute including a join key, wherein a second table in the plurality of tables is not partitioned by the join attribute;
partitioning the second table using the join attribute into a plurality of partitions, wherein the partitioning of the second table is performed during a first processing task in the plurality of processing tasks;
providing a partition of the second table to each node in the database system storing a partition of the first table; and
joining, on each node, one or more partitions of the first table and one or more corresponding partitions of the second table based on the join attribute during a second processing task in the plurality of processing tasks;
wherein
the first and second processing tasks are map phases of a MapReduce process,
a map phase in a plurality of map phases of a MapReduce process includes the determining, the partitioning, the providing, and the joining, the MapReduce process including a plurality of map phases and reduce phases, and
a reduce phase in the plurality of reduce phases includes aggregating data generated as a result of the joining and, optionally, performing at least one operation on the generated data.

16. A method for processing data in a database system containing a plurality of nodes, the method comprising the steps of:
receiving a query for processing of data, wherein the data is stored in a plurality of tables, wherein the plurality of tables is stored on a plurality of nodes within the database system;
extracting a column join attribute from a first table in the plurality of tables for joining of the first table and a second table in the plurality of tables, the column join attribute including a join key, wherein the column join attribute is contained within at least one column selected from the first table;
providing the selected column of the first table to each node in the plurality of nodes storing the second table; and
joining the selected column of the first table with the second table using the extracted column join attribute;
wherein
a map phase in a plurality of map phases of a MapReduce process includes the extracting, the providing, and the joining, the MapReduce process including a plurality of map phases and reduce phases, and
a reduce phase in the plurality of reduce phases includes aggregating data generated as a result of the joining and, optionally, performing at least one operation on the generated data.

17. The method according to claim 16, wherein the second table is partitioned into a plurality of partitions using a partitioning attribute, each partition of the second table is stored on at least one node in the plurality of nodes;
wherein the joining further comprises joining, using the extracted column join attribute, the selected column of the first table and at least one partition of the second table at each node storing the partition of the second table in the database system.

18. The method according to claim 16, wherein the first table is smaller than at least another table in the plurality of tables.

19. The method according to claim 16, wherein the joining further comprises
generating a selection predicate based on the extracted column join attribute, wherein the selection predicate is generated based on a listing of values in the first table; and
using the generated selection predicate, performing the joining.

20. The method according to claim 19, wherein the generated selection predicate is provided to each node in the plurality of nodes storing the second table and the joining is performed during a map phase of a MapReduce processing task using the selection predicate.

21. The method according to claim 16, wherein the plurality of processing tasks are MapReduce processing tasks;
wherein the selecting and the providing are performed during a first MapReduce processing task and the joining is performed during a second MapReduce processing task.

22. A system for processing data in a database system containing a plurality of nodes, comprising:
at least one programmable processor; and
at least one memory including code that, when executed by at least one programmable processor, cause the at least one programmable processor to perform operations comprising:
receiving a query for processing of data, wherein the data is stored in a plurality of tables, wherein the plurality of tables is stored on a plurality of nodes within the database system;
extracting a column join attribute from a first table in the plurality of tables for joining of the first table and a second table in the plurality of tables, the column join attribute including a join key, wherein the column join attribute is contained within at least one column selected from the first table;
providing the selected column of the first table to each node in the plurality of nodes storing the second table; and
joining the selected column of the first table with the second table using the extracted column join attribute;
wherein
a map phase in a plurality of map phases of a MapReduce process includes the extracting, the providing, and the joining, the MapReduce process including a plurality of map phases and reduce phases, and
a reduce phase in the plurality of reduce phases includes aggregating data generated as a result of the joining and, optionally, performing at least one operation on the generated data.

23. The system according to claim 22, wherein the second table is partitioned into a plurality of partitions using a partitioning attribute, each partition of the second table is stored on at least one node in the plurality of nodes;
wherein the joining further comprises joining, using the extracted column join attribute, the selected column of the first table and at least one partition of the second table at each node storing the partition of the second table in the database system.

24. The system according to claim 22, wherein the first table is smaller than at least another table in the plurality of tables.

25. The system according to claim 22, wherein the joining further comprises
generating a selection predicate based on the extracted column join attribute, wherein the selection predicate is generated based on a listing of values in the first table; and
using the generated selection predicate, performing the joining.

26. The system according to claim 25, wherein the generated selection predicate is provided to each node in the plurality of nodes storing the second table and the joining is performed during a map phase of a MapReduce processing task using the selection predicate.

27. The system according to claim 22, wherein the plurality of processing tasks are MapReduce processing tasks;
wherein the selecting and the providing are performed during a first MapReduce processing task and the joining is performed during a second MapReduce processing task.

28. A non-transitory computer-readable medium including code that, when executed by at least one programmable processor, cause the at least one programmable processor to perform operations comprising:
receiving a query for processing of data, wherein the data is stored in a plurality of tables, wherein the plurality of tables is stored on a plurality of nodes within the database system;
extracting a column join attribute from a first table in the plurality of tables for joining of the first table and a second table in the plurality of tables, the column join attribute including a join key, wherein the column join attribute is contained within at least one column selected from the first table;
providing the selected column of the first table to each node in the plurality of nodes storing the second table; and
joining the selected column of the first table with the second table using the extracted column join attribute;
wherein
a map phase in a plurality of map phases of a MapReduce process includes the extracting, the providing, and the joining, the MapReduce process including a plurality of map phases and reduce phases, and
a reduce phase in the plurality of reduce phases includes aggregating data generated as a result of the joining and, optionally, performing at least one operation on the generated data.

29. The non-transitory computer-readable medium according to claim 28, wherein the second table is partitioned into a plurality of partitions using a partitioning attribute, each partition of the second table is stored on at least one node in the plurality of nodes;
wherein the joining further comprises joining, using the extracted column join attribute, the selected column of the first table and at least one partition of the second table at each node storing the partition of the second table in the database system.

30. The non-transitory computer-readable medium according to claim 28, wherein the first table is smaller than at least another table in the plurality of tables.

31. The non-transitory computer-readable medium according to claim 28, wherein the joining further comprises
generating a selection predicate based on the extracted column join attribute, wherein the selection predicate is generated based on a listing of values in the first table; and
using the generated selection predicate, performing the joining.

32. The non-transitory computer-readable medium according to claim 31, wherein the generated selection predicate is provided to each node in the plurality of nodes storing the second table and the joining is performed during a map phase of a MapReduce processing task using the selection predicate.

33. The non-transitory computer-readable medium according to claim 28, wherein the plurality of processing tasks are MapReduce processing tasks;
wherein the selecting and the providing are performed during a first MapReduce processing task and the joining is performed during a second MapReduce processing task.

34. A method for processing data in a database system containing a plurality of nodes, the method comprising the steps of:
- receiving a query for processing of data, wherein the data is stored in at least one table on at least one node in the plurality of nodes, the table is being partitioned into a plurality of partitions;
- generating, based on the received query, at least one processing task containing a first phase and a second phase;
- selecting and aggregating data, from the plurality of partitions, during the first phase of the at least one processing task;
- outputting, based on the selecting and the aggregating, data in response to the received query during at least one of the following: the second phase of the at least one processing task and at least another processing task, wherein the at least one processing task and the at least another processing task are MapReduce processing tasks, each having a map phase and a reduce phase, whereby the first phase is a map phase and the second phase a reduce phase;
- wherein the selecting and aggregation is performed during a map phase of a MapReduce process at a node in a plurality of nodes in the database system.

* * * * *